(12) United States Patent
Waseda et al.

(10) Patent No.: US 7,275,503 B2
(45) Date of Patent: Oct. 2, 2007

(54) HEAT TRANSFER TUBE PANEL MODULE AND METHOD OF CONSTRUCTING EXHAUST HEAT RECOVERY BOILER USING THE MODULE

(75) Inventors: Isao Waseda, Hiroshima (JP); Yuzuru Yoshimoto, Hiroshima (JP); Yoshiki Kitahashi, Hiroshima (JP); Toshinori Shigenaka, Hiroshima (JP); Mitsugi Musashi, Hiroshima (JP); Toru Nishioka, Hiroshima (JP); Tatsuo Kiriyama, Hiroshima (JP); Eiiji Murakami, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 2 days.

(21) Appl. No.: 10/565,298

(22) PCT Filed: Jul. 28, 2004

(86) PCT No.: PCT/JP2004/010721
§ 371 (c)(1),
(2), (4) Date: Jan. 20, 2006

(87) PCT Pub. No.: WO2005/012791
PCT Pub. Date: Feb. 10, 2005

(65) Prior Publication Data
US 2006/0175040 A1 Aug. 10, 2006

(30) Foreign Application Priority Data
Jul. 30, 2003 (WO) .................. PCT/JP03/09656

(51) Int. Cl.
*F22B 37/24* (2006.01)
*G21C 13/024* (2006.01)
(52) U.S. Cl. .................. 122/7 R; 122/510; 29/890.051
(58) Field of Classification Search ................ 122/7 R, 122/510, 494, 511; 376/461–462; 29/890.051
See application file for complete search history.

(56) References Cited

U.S. PATENT DOCUMENTS 2,654,352 A * 10/1953 Schoenfeld .................. 122/494

(Continued)

FOREIGN PATENT DOCUMENTS

| JP | 62-266301 | 11/1987 |
| JP | 2001-041409 | 2/2001 |
| JP | 2002-168403 | 6/2002 |

OTHER PUBLICATIONS

U.S. Appl. No. 10/563,282 to Waseda et al., which was filed on Jan. 4, 2006.
English Language Abstract of JP 2001-041409.
English Language Abstract of JP 2002-266301.

*Primary Examiner*—Gregory Wilson
(74) *Attorney, Agent, or Firm*—Greenblum & Bernstein, P.L.C.

(57) ABSTRACT

A method of constructing an exhaust heat recovery boiler. A required number of heat transfer tube group panel modules (20) are produced in an appropriate size according to design specifications of HRSG, where the heat transfer tube group panel modules (20) each have a large number of heat transfer tubes (6), heat transfer tube group panels (23) constituted of upper and lower collection tubes (7, 8) for the heat transfer tubes (6), a casing (1) for the heat transfer tube group panels (23), heat transfer tube group panel supporting beams (22) provided outside a ceiling wall portion of the casing (1), and a vertical and horizontal module frames (24, 25) provided outside the casing (1). Main frames for supporting the modules (20), including main pillars (33), main beams (34), and bottom wall portion pillars (36), are constructed in advance in a construction site of the heat recovery boiler (HRSG). Each module (20) is transported to the construction site and lowered by a crane (42) into between adjacent main pillars (33). Supporting beams (22) of each module (20) are placed at the height of installation of the main beam (34). Then the horizontal module frames (25), the main beams (34), and the bottom wall portion pillars (36) are connected and fixed, and the vertical module frames (24) and the main pillars (33) are connected and fixed.

8 Claims, 30 Drawing Sheets

U.S. PATENT DOCUMENTS 3,608,525 A * 9/1971 Sharan .................... 122/6 A
4,685,426 A    8/1987 Kidaloski et al.
5,339,891 A * 8/1994 Kidaloski et al. ............. 165/67
5,722,354 A * 3/1998 Sansoucy .................... 122/510
6,588,104 B2 * 7/2003 Heidrich ................ 29/890.051

* cited by examiner

F I G. 1
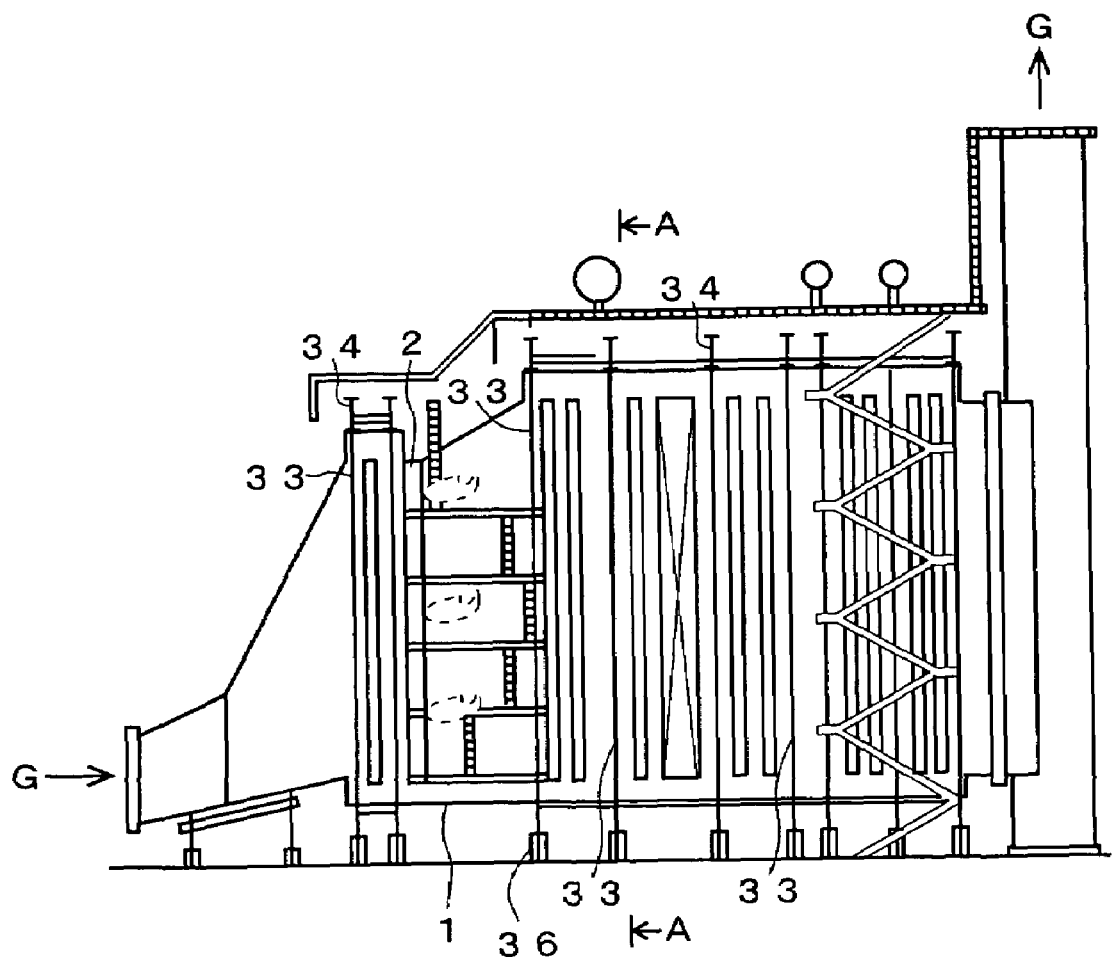

F I G. 5
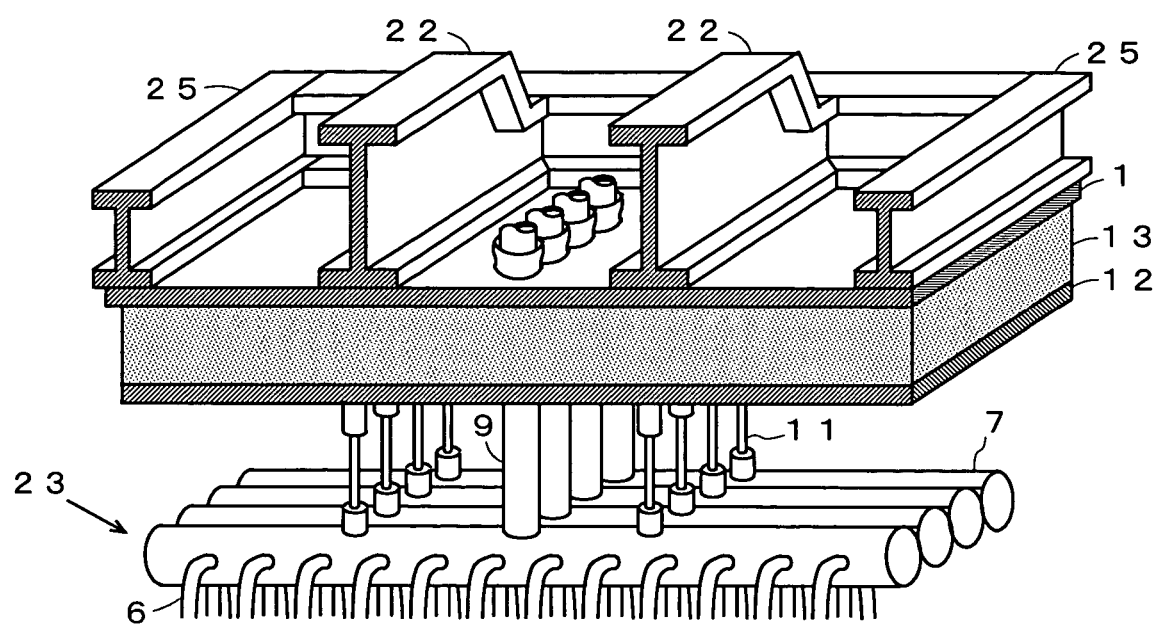

FIG. 6
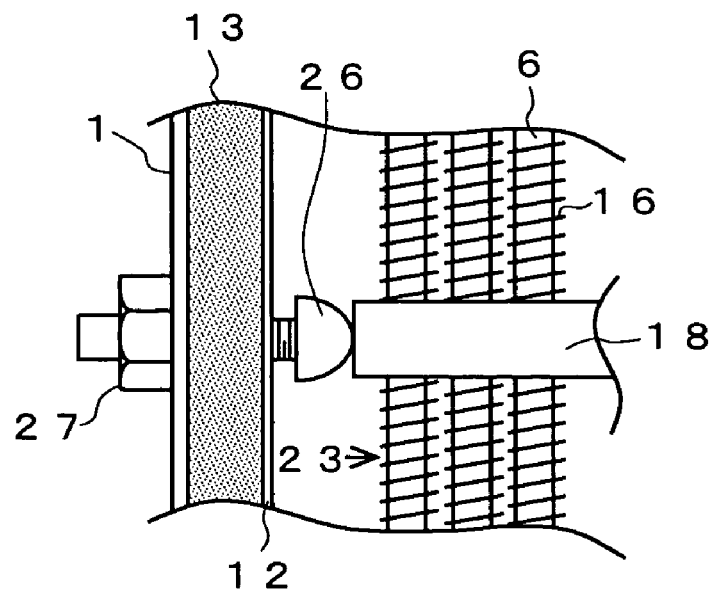
(a)
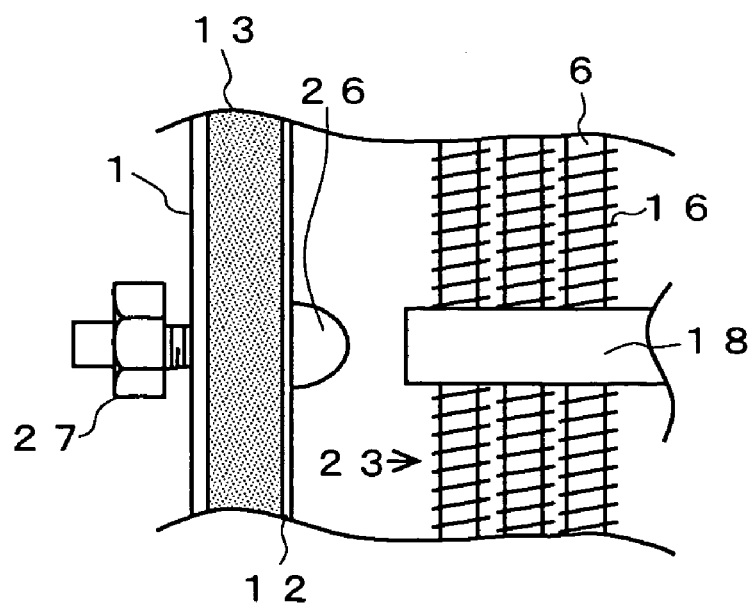
(b)

F I G. 1 5
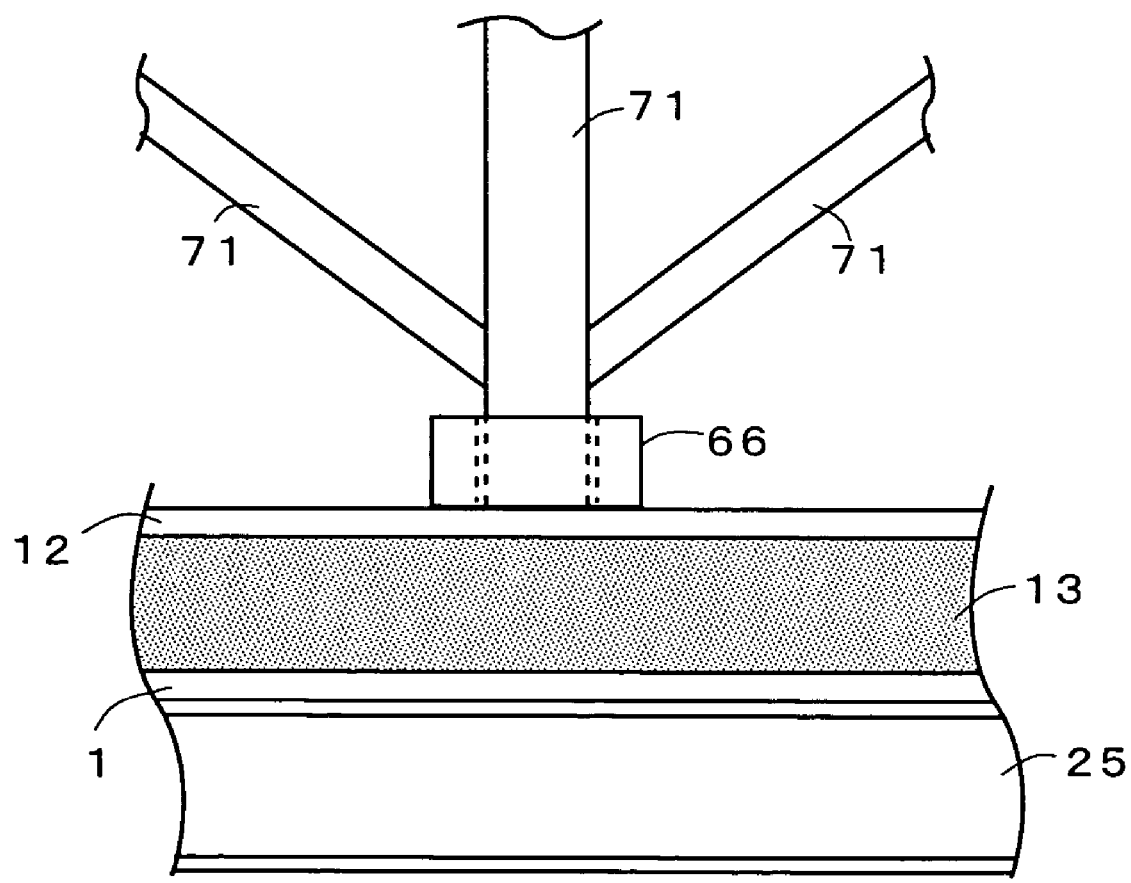

F I G. 21
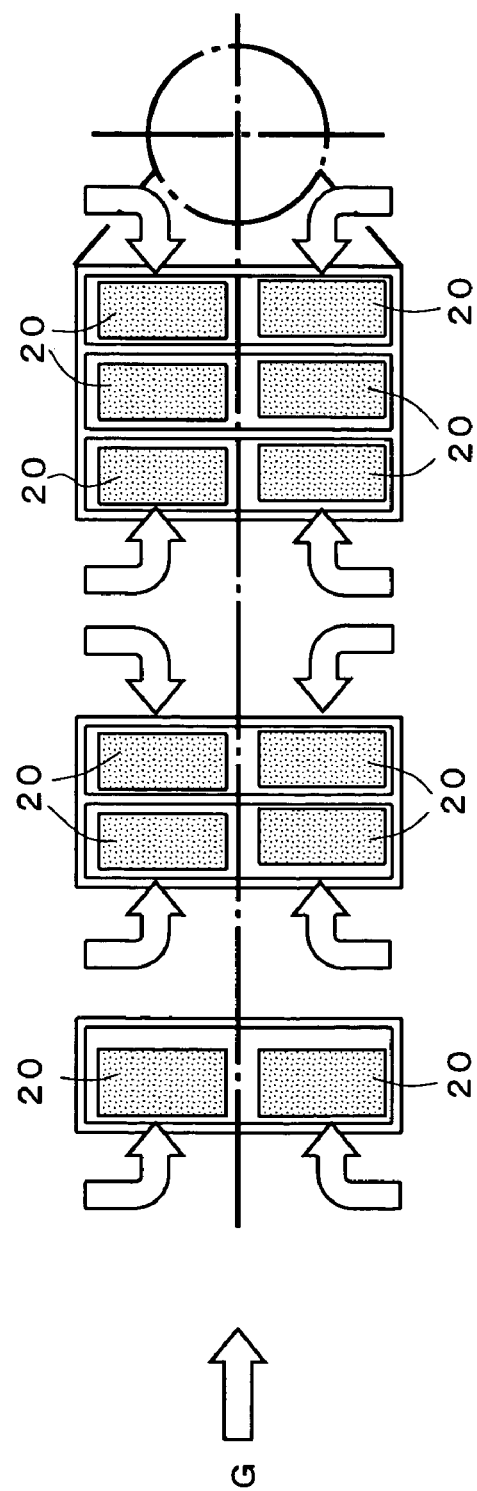

F I G. 26
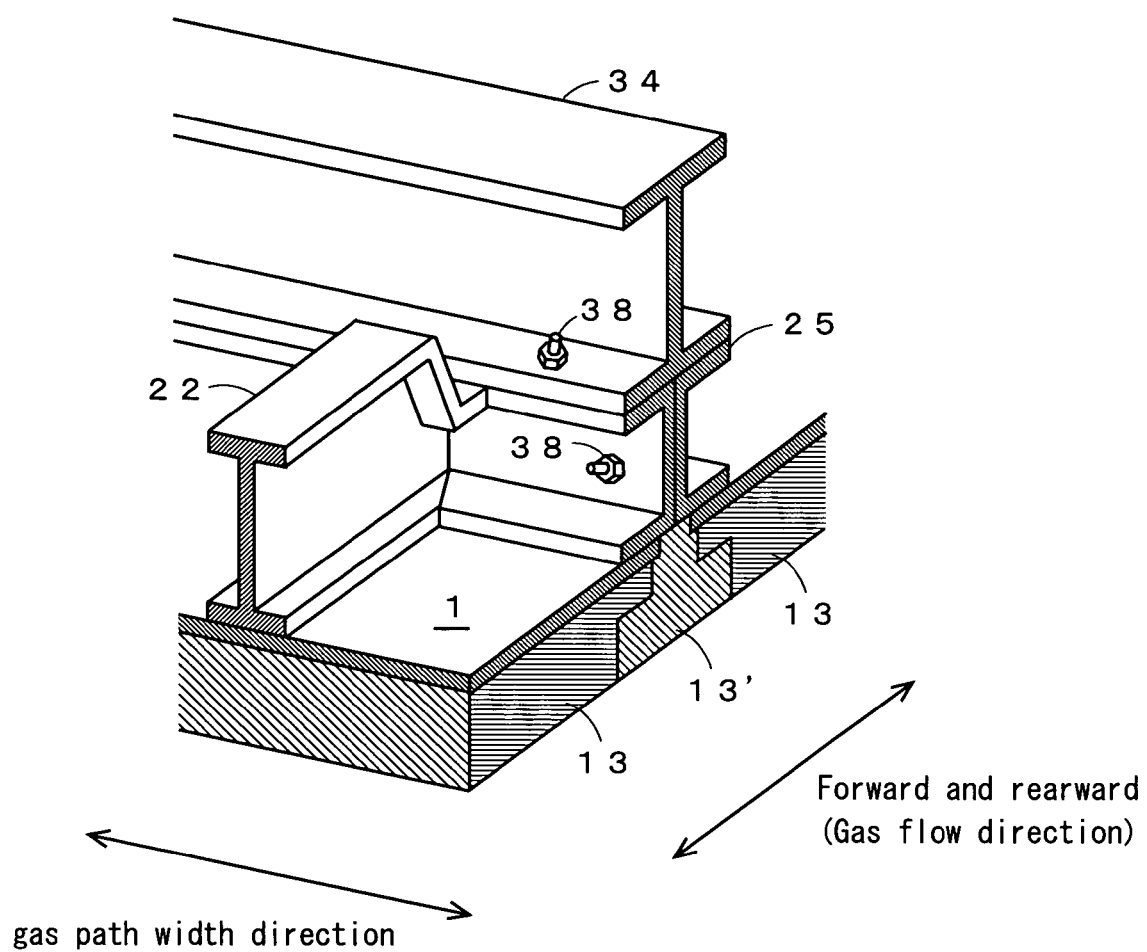

F I G. 2 8
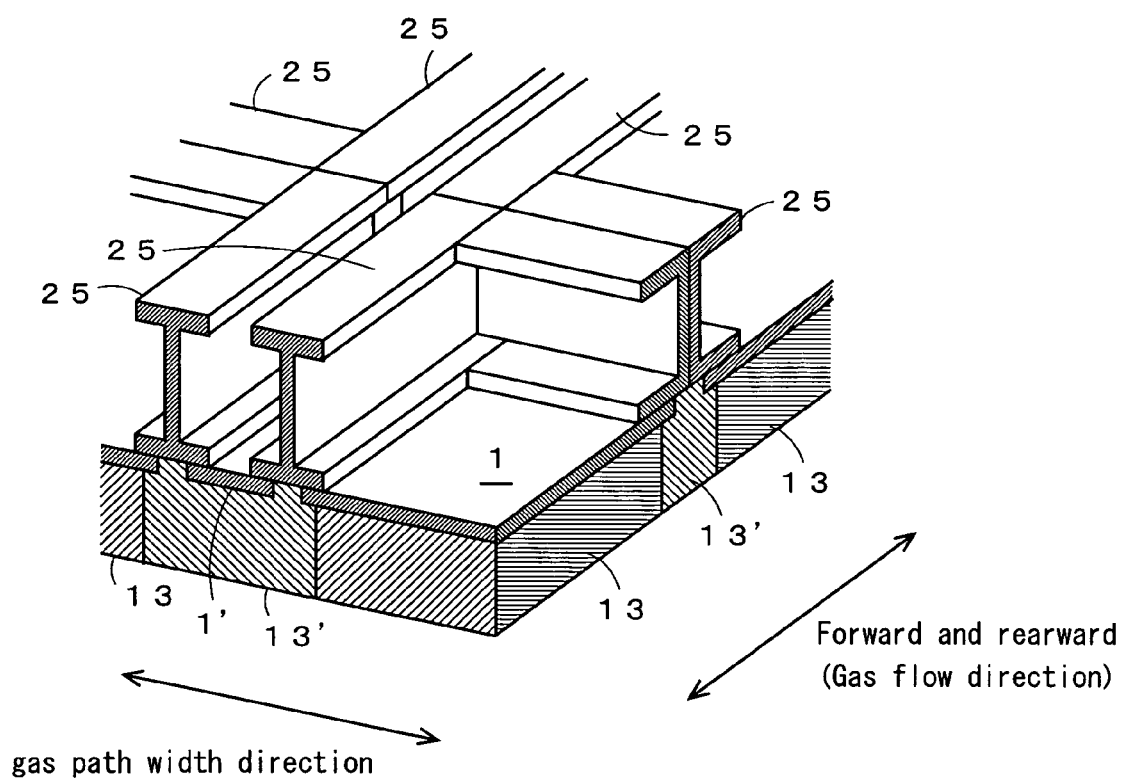

HEAT TRANSFER TUBE PANEL MODULE AND METHOD OF CONSTRUCTING EXHAUST HEAT RECOVERY BOILER USING THE MODULE

TECHNICAL FIELD

The present invention relates to an exhaust heat recovery boiler (hereinafter, also referred to as a heat recovery boiler) to be used in a commercial or industrial combined cycle power generation plant, more specifically, a construction method for a heat recovery boiler by fabricating a module of a heat exchanger tube bundle panel, and a heat exchanger tube bundle panel module to be used for construction of the exhaust heat recovery boiler.

BACKGROUND ART

A combined cycle power generation plant comprising of a combination of a gas turbine and a heat recovery boiler has a power generation efficiency higher than that of other thermal power generation plants, it mainly uses natural gas as a fuel, and it has less production of sulfur oxide and ash dust, so that its exhaust gas purification load is small, for which it has attracted a lot of attention as a successful power generation system. In addition, a combined cycle power generation plant is excellent in load responsiveness since it can quickly change its power generation output according to power demand, and its startup time is comparatively short (it rises quickly), so that it has attracted attention as a power generation method suitable for peaking operation (daily start daily stop) with starts and stops made according to daily power demand cycles.

A combined cycle power generation plant comprises of a power generating gas turbine, a heat recovery boiler that generates steam by using exhaust gas of the gas turbine, and a steam turbine that generates power by using steam obtained by the heat recovery boiler.

FIG. 1 is a schemic view of a horizontal heat recovery boiler equipped with a supplementary firing burner inside. The heat recovery boiler has a casing 1 as a gas duct in which an exhaust gas G from the gas turbine flows horizontally. A supplementary firing burner 2 is located inside the casing 1 in the vicinity of the inlet into which the gas turbine exhaust gas is led, and a number of heat exchanger tubes are located inside the casing 1. The casing 1 is supported by structural members mainly consisting of main columns 33 and main beams 34.

In comparison to components that form conventional high-capacity thermal power generation plants that generate power by burning fossil fuels such as coal, petroleum, or natural gas, etc., the components of a combined cycle power plant including a heat recovery boiler are smaller in capacity and transportable only by sea after being assembled to a nearly completed state in a component manufacturing factory. When the construction site is relatively near the manufacturing factory and near the sea, the installation at the construction site is comparatively easily performed as described above. Therefore, the installation can be completed in shorter time than in the case of high-capacity components of thermal power generation plants.

However, in combined cycle power generation, power generation efficiency higher than the conventional is required. Also required is a high-speed startup and stop operation. Hence the heat recovery boiler is made out of a large number of components, and when the conditions of the construction site are different from the above-mentioned conditions and the degree of completion in the factory is low, its installation requires great labor and time. For example, for a heat recovery boiler, a group of approximately one-hundred heat exchanger tubes and its header are set as one unit and are transported to the construction site, and the heat exchanger tube bundle panels are hung down on a unit basis from structural members (main frames) including the main columns 33 and the main beams 34 of the heat recovery boiler which have been constructed in advance at the construction site with intermediate beams located on the ceiling wall of the casing 1 supported by the structural members. Repetition of such operations of hanging and installing the one-hundred heat exchanger tube bundle panels results in an increase of operations at high elevations and it carries increased safety risks. In addition, the construction period is longer, and the construction costs are higher.

Therefore, by considering transportation and installation of the heat exchanger tube bundle panels 23 of the heat recovery boiler, a technical development has been earnestly demanded which makes the heat recovery boiler construction easy by fabricating modules, wherein a number of heat exchanger tube bundle panels 23 are defined as one block (hereinafter, referred to as a heat exchanger tube bundle panel module). The entire heat recovery boiler is divided into several modules and the modules are completed as one unit within the component manufacturing factory. Installation is completed by assembling the modules at the construction site.

Particularly, when considering that it is difficult to obtain the heat recovery boiler construction parts and secure skilled personnel necessary for construction outside Japan, the module construction method is very effective. The components are completed as partial products divided into a number of modules in the factory in Japan. Quality control or process control systems are adequate and many skilled workers are available in Japan. The modules are transported to the construction site to possibly minimize the operations at the construction site where they are assembled.

The method in which the entire heat recovery boiler is manufactured by dividing it into several modules within the factory and then assembled at the construction site is known by, for example, U.S. Pat. No. 859,550 (Patent family: Japanese Published Unexamined Patent Application No. S62-266301). The U.S. Pat. No. 859,550 discloses a construction method in which modules of heat exchanger tube bundle panels are protected by being housed in a frame body formed of a rigid member when they are transported, and the frame body can be used as it is as a main frame of the heat recovery boiler at the construction site.

[Patent Document 1] U.S. Pat. No. 859,550

[Patent Document 2] Japanese Published Unexamined Patent Application No. S62-266301

DISCLOSURE OF THE INVENTION

However, in the construction method of the U.S. Pat. No. 859,550, the frame body housing the modules of the heat exchanger tube bundle panels becomes large in size since it can be used as it is as a main frame of the heat recovery boiler at the construction site. Therefore, the costs for transporting the modules of the heat exchanger tube bundle panels increase.

An objective of the invention is to provide a construction method for a heat recovery boiler which can reduce the transportation costs, prevent damage to the heat exchanger tube bundle panels during transportation, reduce the installation costs, and minimize waste material after installation, and a heat exchanger tube bundle panel module to be used for this method.

An additional objective of the invention is to provide a construction method for a heat recovery boiler that is most economical since the components forming the heat recovery boiler are formed into several modules and manufactured in the factory and transported to the site and assembled, and a heat exchanger tube bundle panel module to be used for this method.

When constructing a heat recovery boiler, in order to improve the installation performance and operation safety by labor reduction, in particular, reduction of high level work at the construction site of the heat recovery boiler by dividing the heat exchanger tube bundle panel part including a heat exchanger tubes 6 and upper header and lower header thereof into several modules for the entire heat recovery boiler, it is desirable that structural members for the heat recovery boiler such as main columns 33, main beams 34, bottom wall columns 36, etc., are incorporated into the module. However, the modules with the structural members incorporated have a longer cross sectional area at the exhaust gas duct, and become large in size. In the case of the large modules, the heat recovery boiler construction site is limited to a site such as a coastal area near a pier wherein a large barge can approach alongside due to transportation conditions, whereby installation outside Japan of the modules manufactured in Japan is poor in adaptability.

Therefore, in the invention, members (module frames 24 and 25, described later, and so on) that become a part of the structural members such as the main columns 33 and the main beams 34 of the heat recovery boiler are used as components of the heat exchanger tube bundle panel module 20. Thereby, the module frames 24 and 25 can reinforce the heat exchanger tube bundle panel module during transportation.

In the invention, the module frames 24 and 25 are coupled to the heat recovery boiler main frames such as the main columns 33 and the main beams 34, etc., after construction of the heat recovery boiler, so that the transportation costs are reduced according to the heat recovery boiler main frames such as the main columns 33 and the main beams 34, etc., that are not transported, and members are rarely wasted after construction.

(1) The invention relates to an exhaust heat recovery boiler construction method constituted as follows.

A construction method for an exhaust heat recovery boiler that generates steam by disposing a number of heat exchanger tubes 6 in a gas duct in that an exhaust gas flows almost horizontally, wherein, a heat exchanger tube bundle panel module 20 including:

a plurality of heat exchanger tube bundle panels 23 disposed along the gas flow including a number of heat exchanger tubes 6, upper and lower headers 7, 8 of the heat exchanger tubes 6, and vibration restraining supports 18 that are disposed at predetermined intervals to prevent contact between adjacent heat exchanger tubes 6 in the direction crossing the lengthwise direction of the heat exchanger tubes 6;

a casing 1 that forms the gas duct which is attached inside with a thermal insulating material 13 to cover the outer periphery consisting of the ceiling wall, the bottom wall, and both-side walls along the gas flow of the plurality of heat exchanger tube bundle panels 23;

heat exchanger tube bundle panel support beams 22 located outside the ceiling wall of the casing 1 to become the ceiling wall at the time of installation at the boiler construction site;

header supports 11 that penetrate the ceiling wall of the casing 1 and connect the upper headers 7 and the heat exchanger tube bundle panel support beams 22 to hang the upper headers 7 down;

vertical module frames 24 as vertical support members of the heat exchanger tube bundle panels 23 located outside both side walls of the casing 1 to become both side walls at the time of installation at the boiler construction site; and horizontal module frames 25 as horizontal support members of the heat exchanger tube bundle panel 23 located outside the ceiling wall and bottom wall of the casing 1 to become the ceiling wall and the bottom wall at the time of installation at the construction site, is set as one module unit and a necessary number of modules are prepared in a proper size according to the design specifications of the exhaust heat recovery boiler, main frames for supporting the heat exchanger tube bundle panel module 20 including the main columns 33, the main beams 34 and the bottom wall columns 36 are constructed in advance at the construction site of the exhaust heat recovery boiler, the heat exchanger tube panel modules 20 are inserted between adjacent two main columns 33 and the heat exchanger tube panel support beams 22 of the heat exchanger tube bundle panel modules 20 are set at the setting height of the main beams 34 at the exhaust heat recovery boiler construction site, and the vertical module frames 24 and the main columns 33, the horizontal module frame 25 on the ceiling wall side and the main beam 34, and the horizontal module frame 25 on the bottom wall side and the bottom wall columns 36 are connected and fixed to each other.

At the exhaust heat recovery boiler construction site, it is possible that bottom wall columns 36 having surfaces orthogonal to the gas flow and the widths of which in the horizontal direction of the plane are made wider than those of the main columns 33 are disposed by a number enabling the bottom wall corners of the heat exchanger tube bundle panel modules 20 to be placed thereon, and at least on the wide width portions of the bottom wall columns 36 of both side walls, the main columns 33 and the lower ends of the vertical module frames 24 are placed.

In addition, when transporting the heat exchanger tube bundle panel modules 20 of one module unit, vibration restraining fixing members 26 and 61 are disposed between the vibration restraining supports 18 and the casing 1 which becomes both side walls and between the lower headers 8 and the casing 1, whereby damage during transportation can be prevented.

When each heat exchanger tube bundle panel module 20 is formed into a size that enables two or more modules to be disposed in the horizontal direction of a plane orthogonal to the gas flow of the exhaust heat recovery boiler, and the vertical module frames 24 are formed of a vertical module frame 24a disposed on the casing 1 side and a vertical module frame 24b disposed on the adjacent heat exchanger tube bundle panel module 20 side, a construction method for the exhaust heat recovery boiler is employed in which the vertical module frame 24a and the horizontal module frame 25 of the heat exchanger tube bundle panel module 20 are connected to the main frames for supporting the module 20 including the main columns 33, the main beams 34 and the bottom wall columns 36, the module frame 24*b* is removed, and furthermore, when several reinforcing module frames 24*c* that are located at positions facing the heat exchanger tube bundle panel 23 on the front surface side and/or the back surface side in the gas flow direction of each heat exchanger tube bundle panel module 20 and connect the vertical module frames 24*a* and 24*b* to each other, the reinforcing module frames 24*c* are also removed.

When each heat exchanger tube bundle panel module 20 is formed into a size enabling two or more modules to be disposed in the horizontal direction of a plane orthogonal to the gas flow of the exhaust heat recovery boiler, and when first aseismic braces 59*a* and 59*a* that connect the end portion inner side of the casing 1 to become the ceiling wall and the central portion inner side of the casing 1 to become the side wall of the heat exchanger tube bundle panel module 20 respectively, are located at positions facing the heat exchanger tube bundle panels 23 on the surface side and/or the back surface side in the gas flow direction, and the second aseismic braces 59*b* and 59*b* that connect the end of the casing 1 to become the bottom wall side and the central portion inner side of the casing 1 to become the side wall of the heat exchanger tube bundle panel module 20 respectively, are located at positions facing the heat exchanger tube bundle panels 23 on the surface side and/or the back surface side in the gas flow direction, the first and second aseismic braces 59*a* and 59*b* are used not only during transportation and installation at the boiler construction site of the heat exchanger tube bundle panel modules 20, but also are used even after completion of the boiler installation without removing the braces.

When transporting the heat exchanger tube bundle panel modules 20, the first and second aseismic braces 59*a* and 59*b* and a transporting spacer 63 that maintains the gap between the surface and/or the back surface in the gas flow direction of the heat exchanger tube bundle panel 23 are disposed, whereby the first and second aseismic braces 59*a* and 59*b* can be commonly used as transporting reinforcing members, so that it becomes unnecessary to newly located transporting reinforcing members.

When each heat exchanger tube bundle panel module 20 is formed into a size that enables two or more modules to be located in the horizontal direction of a plane orthogonal to the gas flow of the exhaust heat recovery boiler, the end of the casing 1 to become the ceiling wall side and the end of the casing 1 to become the bottom wall side of the heat exchanger tube bundle panel module 20 respectively are coupled to each other by first transporting reinforcing member 70 by a removable coupling method, and the first transporting reinforcing member 70 and the casing 1 to become the side wall side are coupled to each other by a plurality of second transporting reinforcing members 71 by a removable coupling method, at the time of transporting the heat exchanger tube bundle panel modules 20 and at the time of installation at the boiler construction site, the first transporting reinforcing member 70 and the second transporting reinforcing members 71 are left as they are, and these are removed after completion of installation, whereby the exhaust heat recovery boiler is constructed.

(2) In addition, the invention relates to a heat exchanger tube bundle panel module for constructing an exhaust heat recovery boiler constituted as follows.

A heat exchanger tube bundle panel module for constructing an exhaust heat recovery boiler which generates steam by disposing a number of heat exchanger tubes 6 inside a gas duct in that an exhaust gas flows almost horizontally, comprises:

a plurality of heat exchanger tube bundle panels 23 disposed along the gas flow, each including a number of heat exchanger tubes 6, upper and lower headers 7 and 8 of the heat exchanger tubes 6, and vibration restraining supports 18 located at predetermined intervals to prevent contact between adjacent heat exchanger tubes 6 in a direction crossing the lengthwise direction of the heat exchanger tubes 6, and a casing 1 that forms the gas duct and has a thermal insulating material 13 attached inside to cover the outer periphery formed by the ceiling walls, the bottom walls, and both side walls along the gas flow of the plurality of heat exchanger tube bundle panels 23, heat exchanger tube bundle panel support beams 22 located outside the ceiling wall of the casing 1 to become the ceiling wall when installing at the boiler construction site, header supports 11 that penetrate the ceiling wall of the casing 1 and connect the upper headers 7 and the heat exchanger tube bundle panel support beams 22 to hang the upper headers 7 down, vertical module frames 24 that are vertical support members of the heat exchanger tube bundle panels 23 located outside the casing 1 to become both side walls when installing at the boiler construction site, and horizontal module frames 25 that are horizontal support members of the heat exchanger tube bundle panels 23 located outside the ceiling wall and outside the bottom wall of the casing 1 to become the ceiling wall and the bottom wall when installing at the boiler construction site, wherein when installing an exhaust heat recovery boiler at the construction site, a heat exchanger tube bundle panel module 20 with a size enabling two or more modules to be disposed adjacent to each other in the horizontal direction of a plane orthogonal to the gas flow of the boiler is set as one module unit, and the main columns 33 and the vertical module frames 24 in the main frames for supporting the module including the main columns 33, the main beam 34, and the bottom wall column 36 to be constructed in advance at the exhaust heat recovery boiler construction site, the main beam 34 and the horizontal module frame 25 on the ceiling wall side, and the bottom wall column 36 and the horizontal module frame 25 on the bottom wall side can be connected and fixed to each other.

The vertical module frames 24 consist of a vertical module frame 24*a* located on the casing 1 side and a vertical module frame 24*b* located on the heat exchanger tube bundle panel module 20 side, and is further located with a plurality of reinforcing module frames 24*c* that are positioned to face the heat exchanger tube bundle panels 23 on the surface side and/or the back surface side in the gas flow direction of each heat exchanger tube bundle panel module 20, and connect the vertical module frames 24*a* and 24*b* and are removed after installing the boiler. In this case, after installing the boiler of the modules 20, the vertical module frame 24*b* and the reinforcing module frame 24*c* are removed.

In addition, it is possible that the vertical module frames 24 consist of a vertical module frame 24*a* disposed on the casing 1 side, and includes the first aseismic braces 59*a* and 59*a* that connect the end portion inner side of the casing 1 to become the ceiling wall side and the central portion inner side of the casing 1 to become the side wall, and are positioned to face the heat exchanger tube bundle panels 23 on the surface side and/or back surface side in the gas flow direction of the heat exchanger tube bundle panel modules 20, and the second aseismic braces 59*b* and 59*b* that connect the end of the casing 1 to become the bottom wall side and the central portion inner side of the casing 1 to become the side wall side, and are positioned to face the heat exchanger tube bundle panels 23 on the surface side and/or back surface side in the gas flow direction. In this case, the heat exchanger tube bundle panels 23 can be protected when the modules 20 are transported and installed, and simultaneously, the first and second aseismic braces 59a and 59b can be used as reinforcing members of the heat exchanger tube bundle panels 23 without being removed after the heat exchanger tube bundle panel modules 20 are installed in an exhaust heat recovery boiler.

Furthermore, the vertical module frames 24 can be located with the first transporting reinforcing member 70 that couples the end of the casing 1 to become the ceiling wall side and the end of the casing 1 to become the bottom wall side to each other, and is removed after completion of installation in the boiler, and a plurality of second transporting reinforcing members 71 that couple the first transporting reinforcing member 70 and the casing 1 to become the side wall side to each other and are removed after completion of installation in the boiler, positioned to face the heat exchanger tube bundle panel modules 23 on the surface side and/or the back surface side in the gas flow direction of the respective heat exchanger tube bundle panels 20.

Herein, for the coupling portion between both ends of the casing 1 to become the ceiling wall side and the bottom wall side and the first transporting reinforcing member 70 and the coupling portions between the side wall side casing 1 and the second transporting reinforcing members 71, a fitting type coupling method is used for a coupling portion where a compressive load is applied, and a bolt coupling method is used for a coupling portion where a tensile load is applied, whereby enabling the first transporting reinforcing member 70 and the second transporting reinforcing members 71 to be easily removed after installing the heat exchanger tube bundle panel modules 20 in the exhaust heat recovery boiler.

In addition, even when bolt coupling is used for both the coupling portion between both ends of the casing 1 to become the ceiling wall side and the bottom wall side and the first transporting reinforcing member 70 and the coupling portions between the casing 1 to become the side wall side and the second transporting reinforcing members 71, the first transporting reinforcing member 70 and the second transporting reinforcing members 71 can be easily removed after installing the heat exchanger tube bundle panel modules 20 in the exhaust heat recovery boiler.

In addition, it is allowed that the reinforcing module frame 24c, the first and second aseismic braces 59a and 59b, and the second transporting reinforcing members 71 are disposed on either the surface side or the back side in the gas flow direction of the heat exchanger tube bundle panels 23 as long as protection of the modules 20 is possible at the time of transportation, etc.

Furthermore, gas passing preventive baffle plates 28 and 28 are attached to both side surfaces of the plane (gas path width plane) orthogonal to the gas flow direction of the heat exchanger tube bundle panel 23 of each heat exchanger tube bundle panel module 20, and between the respective heat exchanger tube bundle panels 23 of two modules 20 and 20 adjacent to each other in the horizontal direction of the surface orthogonal to the gas flow, a gas short pass preventive plates 29 which are connected at one side surface to the baffle plate 28 of one heat exchanger tube bundle panels 23, and come into contact at the other side surface with the baffle plate 28 of the other heat exchanger tube bundle panel 23, are attached, whereby one side wall of the gas short pass preventive plate 29 is strongly pressed by the baffle plate 28 in contact with it due to the gas flow, eliminates the gap between the two heat exchanger tube bundle panels 23 disposed adjacent to each other, and prevents generation of gas that does not pass the insides of the heat exchanger tube bundle panels 23 (gas short pass). Particularly, by folding the side surface of the gas short pass preventive plate 29 to come into contact with the baffle plate 28 of the heat exchanger tube bundle panel 23 toward the upstream side of the gas flow inside the gas duct, the gas flow is engulfed by the folding portion, the folding portion is more strongly pressed against the baffle plate 28, and the gas short pass preventive effect increases further.

BRIEF DESCRIPTION OF THE DRAWINGS

[FIG. 1] is a schemic view of a horizontal exhaust heat recovery boiler;

[FIG. 5] is a perspective view of upper headers and an upper casing portion of the heat exchanger tube bundle panel module of FIG. 2;

[FIG. 6] are side views of a vibration restraining fixing member of the heat exchanger tube bundle panel module of FIG. 2;

[FIG. 15] is a detailed view of part C of FIG. 12;

[FIG. 21] is a plan view showing procedures of attaching the heat exchanger tube bundle panel module of FIG. 4 between structural members;

[FIG. 26] is a perspective view of a section cut in vertical two directions inside the heat exchanger tube bundle panel module of the oval area B of FIG. 2;

[FIG. 28] is a perspective view of a section cut along vertical two directions inside the heat exchanger tube bundle panel module of the oval area C of FIG. 2;

BEST MODES FOR CARRYING OUT THE INVENTION

A modulation construction method of a horizontal exhaust heat recovery boiler that forms a gas duct in the horizontal direction according to embodiments of the invention is described with reference to the drawings.

Figure 2:
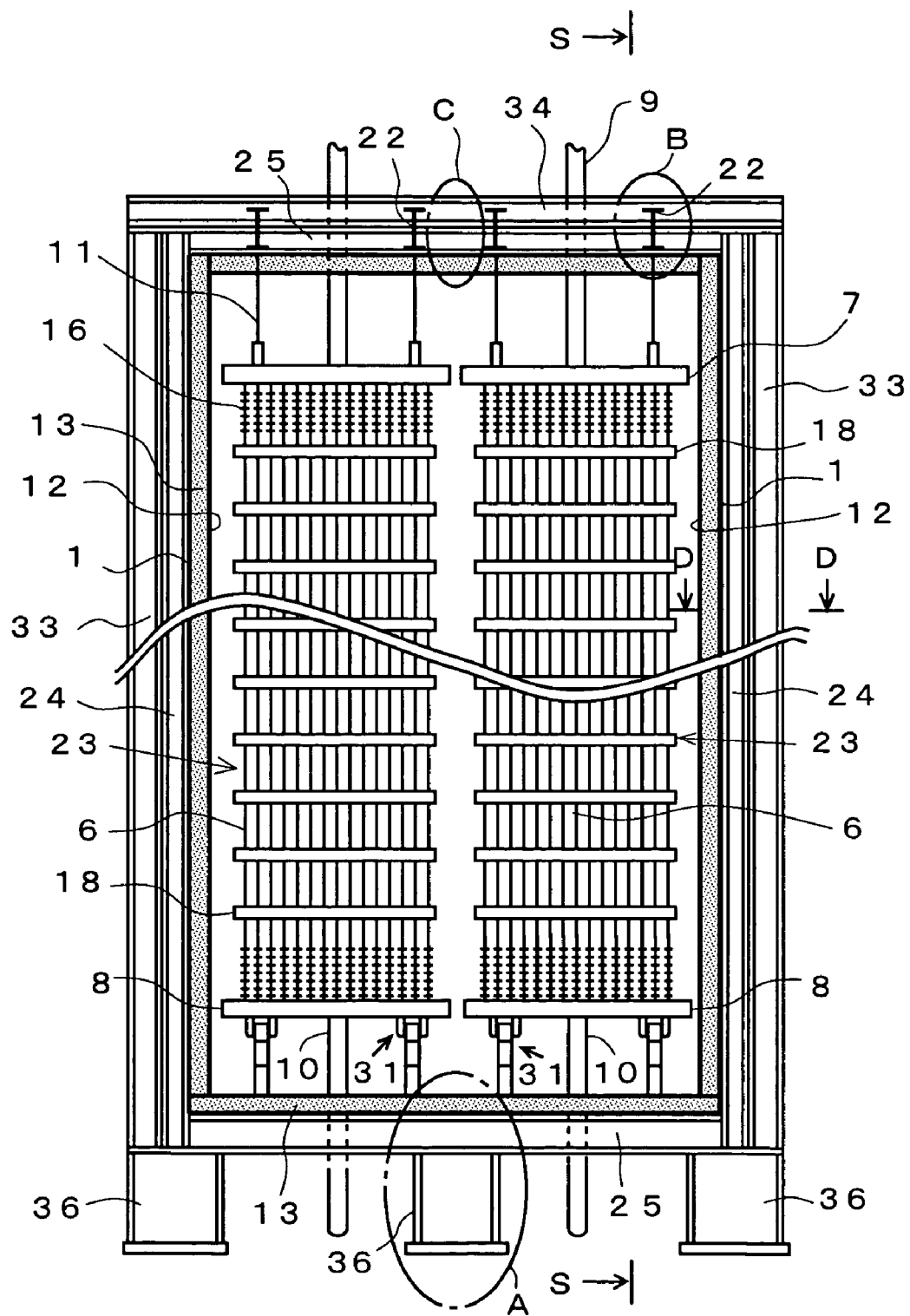
[FIG. 2] is a schemic arrangement drawing (sectional view on the arrow A-A f FIG. 1) of a first embodiment of the invention viewed from the gas flow direction of the boiler of FIG. 1, showing two heat exchanger tube bundle panel modules and structural members supporting the modules formed integrally with each other.
Figure 3:
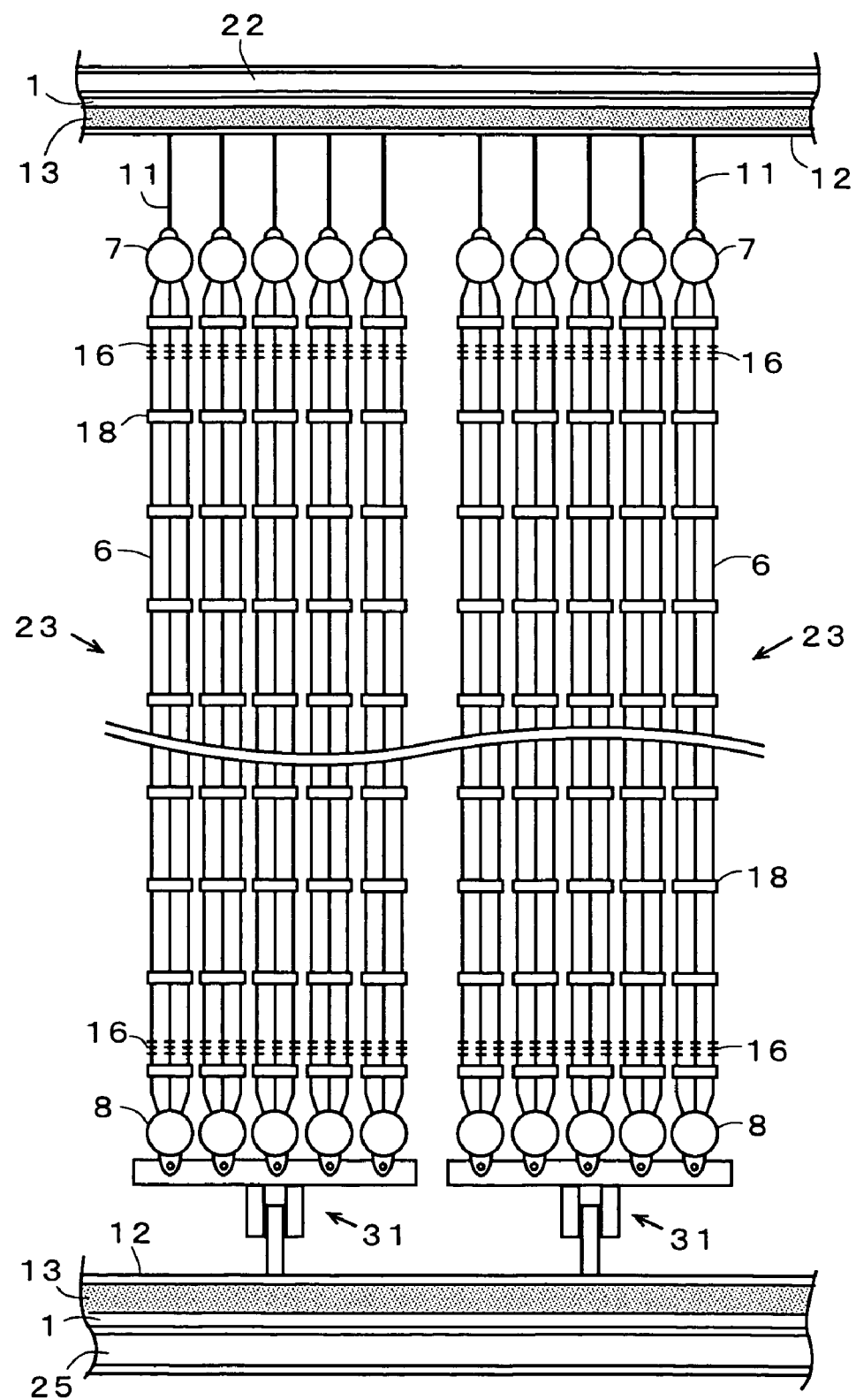
[FIG. 3] is a side view of the heat exchanger tube bundle panel module of the first embodiment of the invention, and is a sectional view on the arrow S-S of FIG. 2.

FIG. 1 is a schemic view of the horizontal exhaust heat recovery boiler, FIG. 2 shows a section orthogonal to the gas flow direction of the heat recovery boiler of an exhaust gas G flow horizontally shown in FIG. 1, and FIG. 3 shows a section in the gas flow direction. FIG. 2 is equivalent to a sectional view on the arrow A-A of FIG. 1, and FIG. 3 is equivalent to a sectional view on the arrow S-S of FIG. 2.

The heat exchanger tube bundle panel 23 of the exhaust heat recovery boiler includes, as shown in FIG. 2 or FIG. 3, a number of heat exchanger tubes 6, an upper header 7, a lower header 8, an upper connecting duct 9, and a lower connecting duct 10, and the heat exchanger tube panel 23 is supported onto a heat exchanger tube bundle panel support beam 22 via header supports 11. The outer periphery of the heat exchanger tube bundle panels 23 is enclosed by a thermal insulating material (thermal insulator) 13 and a casing 1 covering the outer periphery of the thermal insulating material. The casing 1 is made of a steel plate, and its plate thickness is approximately 6 millimeters. Inside the thermal insulating material 13, a liner 12 (also referred to as an inner casing) for retaining the thermal insulating material is located (the casing 1 including the lamination of the liner 12 and the thermal insulating material 13 is simply referred to as a casing 1 in some cases). On the outer surface of the heat exchanger tube 6, a fin 16 (partially shown in FIG. 2 and FIG. 3) is wound, and a plurality of fin-attached heat exchanger tubes 6 are arranged in the exhaust gas flow direction in zigzags, that is, in staggered arrangement. When the exhaust gas G passes between the heat exchanger tubes 6 and the speed reaches a certain extent or more, the fluid force of the passing exhaust gas G and the rigidity of the heat exchanger tubes 6 forming the passage of the exhaust gas G interfere with each other, and may cause a phenomenon called flow induced vibration in that self-excited vibration of the heat exchanger tubes 6 occurs. In order to prevent the flow induced vibration and avoid contact between forward and rearward and left and right heat exchanger tubes 6, the tubes are bundled by vibration restraining supports 18 located in a direction orthogonal to the tube axis.

As shown in FIG. 3, between the lower header 8 and a wall face structure formed of the lower casing 1, the liner 12, and the thermal insulating material 13, a panel aseismic device 31 having a structure that adapts to vertical thermal elongation and prevents vibrations in the forward and rearward directions is located.

Figure 4:
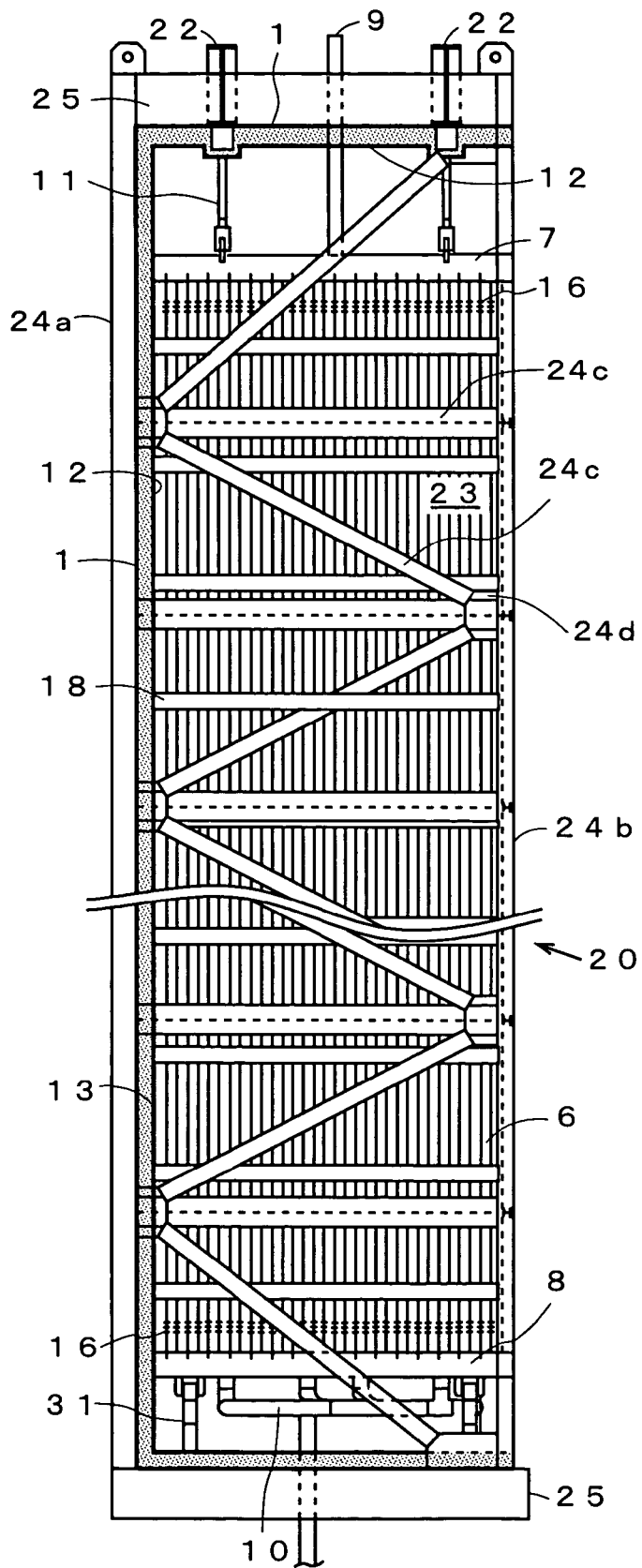
[FIG. 4] is a side view of the heat exchanger tube bundle panel module of FIG. 2 (viewed from the gas flow direction when installing)

FIG. 4 is a side view of a heat exchanger tube bundle panel module 20 of a first embodiment of the invention. One through several heat exchanger tube bundle panels 23 each including a plurality of fin-attached heat exchanger tubes 6, the upper header 7, and the lower header 8, etc., are arranged in parallel to the gas flow direction to form a module, and are integrated with vertical module frames 24 (24a, 24b) and horizontal module frames 25 that are commonly used as transporting frames are integrated together to obtain each heat exchanger tube bundle panel module (hereinafter, may be simply referred to as a module) 20. The number of panels in the heat exchanger tube panel module 20 is set by considering the limits in transportation to the construction site, installation efficiency at the installation site, and limitations due to system performance, etc.

Therefore, in one heat exchanger tube panel module 20, heat exchanger tube bundle panels 23 including many (for example, 600) heat exchanger tubes 6, their upper and lower headers 7 and 8, and upper and lower connecting ducts 9 and 10, and around these, a wall face structure that forms each part of the casing 1, the liner 12, and the thermal insulating material 13 which construct the ceiling wall face, and the side wall face, and the bottom wall face of the heat recovery boiler are located, and these are integrated together by being housed in the module frames 24 and 25.

FIG. 5 is a schemic perspective view including a partial section of a supporting structure from which the upper header 7 portion of one heat exchanger tube bundle panel module 20 consisting of four heat exchanger tube bundle panels 23 are hung down via the ceiling wall of the casing 1 as an example. FIG. 3 shows a state where two heat exchanger tube bundle panel modules 20 each consisting of five heat exchanger tube bundle panels 23 are installed along the gas flow direction of the boiler.

To the peripheral portions on the four corners of the ceiling of the casing 1 of each heat exchanger tube bundle panel module 20, horizontal module frames 25 are fixed, and on the casing 1 on the inner side of the horizontal module frames 25, a plurality of heat exchanger tube bundle panel support beams 22 are fixed. The heat exchanger tube bundle panel support beams 22 support the upper headers 7 of the heat exchanger tube bundle panels 23 via the header supports 11, and both ends of the heat exchanger tube bundle panel support beams 22 are weld-connected to the horizontal module frames 25 (the horizontal module frame 25 on the near side is not shown in FIG. 5).

As shown in FIG. 4, the vertical module frames 24 (24a and 24b) and the horizontal module frames 25 are weld-connected to the casing 1 in advance. The module frames 24 and 25 are formed of wide flange beams, etc., with widths narrower than the widths of the main columns 33 and the main beams 34 located in advance at the construction site. These are integrated with the main beams 33 and the main columns 34 located outside the casing 1 and serve as structural members of the casing 1 of the heat recovery boiler.

The vertical module frames 24 are connected to the main columns 3 at the construction site, the ceiling wall side horizontal module frame 25 is connected to the main beams 34 at the construction site, and the bottom wall side horizontal module frames 25 are connected to the bottom wall columns 36. The module frames 24 and 25 are located at positions of a part of the main columns 33 and the main beams 34 of the heat recovery boiler at the construction site, and the module frames 24 and 25 become reinforcing members when transporting the modules 20. In addition, the lengths of the module frames 24 and 25 projecting to the outside of the casing 1 that are comparatively narrower than the main columns 33 and the main beams 34 are shorter than the widths of the main columns 33 and the main beams 34, so that the increase in transportation costs due to location of the module frames 24 and 25 can be negligible.

Of the two vertical module frames 24a and 25b of the module 20 shown in FIG. 4, the module frame 24b is positioned at the center of the gas duct of the heat recovery boiler when two modules 20 are arranged parallel to the width direction of the gas duct (the horizontal direction of the plane orthogonal to the gas flow), and the two module frames 24a and 24b are attached with a number of reinforcing module frames 24c on the surface in the width direction of the module 20 for reinforcement during transportation, and brackets 24d for connecting the module frames 24c to the module frame 24b are attached to the module frame 24b. These module frames 24b and 24c and the brackets 24d are removed after installing the modules 20.

In this embodiment, in order to prevent the modules 20 from being damaged by vibrations during transportation, it is possible that, as shown in FIG. 6, between the vibration restraining support 18 and a wall face structure formed by the casing 1, the liner 12, and the thermal insulating material 13, a vibration restraining fixing bolt 26 is located. After pressing the vibration restraining fixing bolt 26 that can be pressed toward the end of the vibration restraining support 18 from the outside of the wall face structure (may be simply referred to as the casing 1), the bolt is tightened by a lock nut 27 to fix the heat exchanger tube bundle panel 23 to the wall face structure via the vibration restraining support 18 (FIG. 6(a)). When installing the module 20 at the heat recovery boiler construction site, the tightened lock nut 27 is loosened to release the pressing of the fixing bolt 26 against the vibration restraining support 18, whereby removing the module 20 from the wall face structure (FIG. 6(b)).

It is also possible that a fixing member having a plate with a length corresponding to the distance between the casing 1 and the end of the vibration restraining support 18 is welded to both the wall face structure and the vibration restraining support 18 and this fixing member is cut after transportation although this is not shown.

Furthermore, it is also possible that a plate such as one made of wood with a thickness corresponding to the gap between the casing 1 and the end of the vibration restraining support 18 is inserted in the gap, and this plate is removed after transportation.

Furthermore, it is also possible that a filler such as sand or gel material, etc., is filled in necessary points of the heat exchanger tube bundle panel 23 inside the wall face structure so as to prevent the heat exchanger tube bundle panel 23 from vibrating and this filler is extracted after transportation.

Moreover, although this is not shown, it is also possible that a vibration restraining fixing member having a pair of rods that have changeable widths and can temporarily fix the set widths is sandwiched between the wall face structure and the vibration restraining support 18 during transportation to prevent the heat exchanger tube bundle panel 23 from being damaged during transportation.

A heat recovery boiler for a combined cycle power generation plant with a gas turbine burning temperature of the 1300° C. class is divided into two or three modules 20 in the width direction of the gas duct (direction orthogonal to the gas flow) (FIG. 2 is a sectional view of modules 20 that are two-divided in the gas flow direction and assembled to the main columns 33 and the main beams 34), and in the gas flow direction, each module 20 contains one to twelve heat exchanger tube bundle panels 23, and this quantity is determined based on layout of the panels 23 and restrictions on transportation. The modules 20 may be different in size depending on their positions inside the heat recovery boiler. One module 20 has a size of, for example, 26 m in the up and down direction of the paper surface of FIG. 4, 3 to 4.5 m in the paper depth direction, and 1.5 to 4 m in the paper surface transverse direction.

Figure 7:
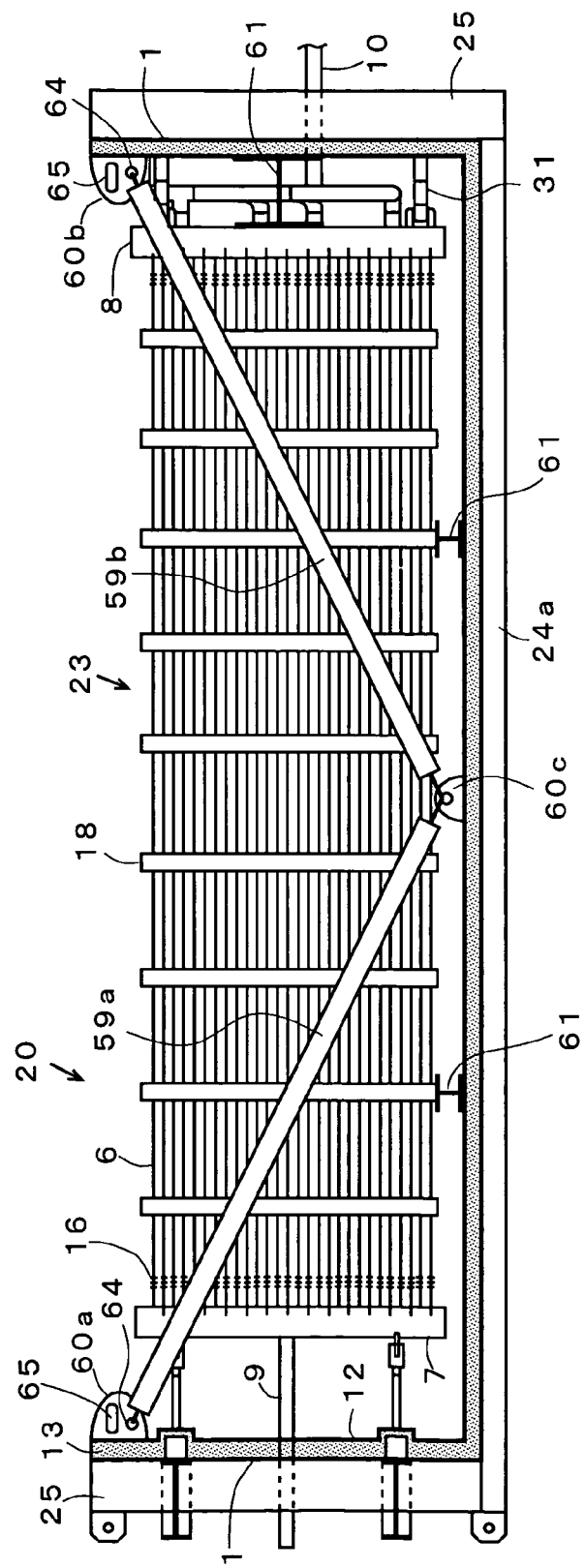
[FIG. 7] is a side view of a heat exchanger tube bundle panel module of a second embodiment of the invention.

FIG. 7 shows a heat exchanger tube bundle panel module 20 of a second embodiment of the invention. This module 20 is transported by laying the side wall face horizontally, so that the side view of the horizontally laid state is shown in FIG. 7. Inside the casing 1 (the casing 1 including a lamination of the liner 12 and the heat reversing material 13 inside may be simply referred to as a casing) including a lamination of the liner 12 and the thermal insulating material 13 inside, a plurality of heat exchanger tube bundle panels 23 each including a number of heat exchanger tubes 6, an upper header 7 and a lower header 8 thereof, and vibration restraining supports 18, etc., are housed.

Between the heat exchanger tube bundle panels 23 and the casing 1, transporting spacers 61 that fix the heat exchanger tube bundle panels 23 are set between the vibration restraining support 18 and the casing 1 and between the lower header 8 and the casing 1.

In addition, lugs 60a and 60b are attached to the inner surfaces of both ends of the ceiling wall side casing 1 and the bottom wall side casing 1, a lug 60c is attached to the central portion inner surface of the side wall casing 1, a aseismic brace 59a is attached between the lugs 60a and 60c, and a aseismic brace 59b is attached between the lugs 60b and 60c. The lugs 60a and 60b are located with a transporting hole 64 and a boiler driving slot 65, respectively, and when transporting, the first and second aseismic braces 59a and 59b are attached into the transporting holes 64. Therefore, the first and second aseismic braces 59a and 59b are roughly integrated with the casing 1.

Since a triangular shape is formed for the ceiling wall side casing 1, the sidewall side casing 1, and the first aseismic brace 59a and a triangular shape is formed for the bottom wall side casing 1, the sidewall side casing 1, and the second aseismic brace 59b, the casings 1 on the respective wall faces are reinforced to become a firm structure by the first and second aseismic braces 59a and 59b, so that it is unnecessary to located the reinforcing module frame 24c of FIG. 4.

Figure 9:
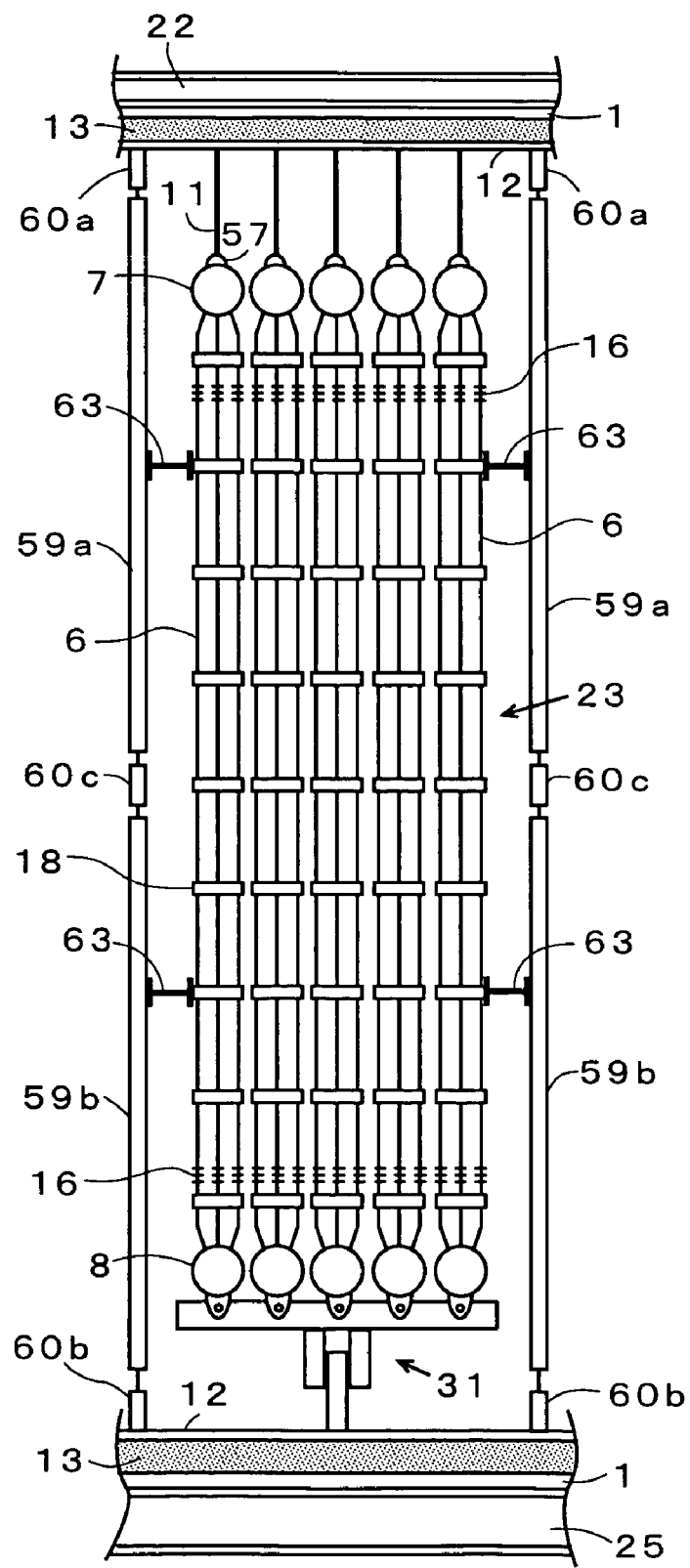
[FIG. 9] is a view along the S-S line of FIG. 2 in which the heat exchanger tube bundle panel module of FIG. 7 and structural members supporting the module are integrated.

In addition, as shown in FIG. 9 (view on the section along S-S of FIG. 2), after installing the heat exchanger tube bundle panel module 20 to the main columns 33 and the main beams 34 of the main frames, transporting spacers 63 are located for maintaining the distances between the heat exchanger tube bundle panels 23 on the surface side and/or back surface side and the first and second aseismic braces 59a and 59b facing each other in the gas flow direction, whereby the module 20 can be prevented from deforming during marine transportation without vibrations of the heat exchanger tube bundle panels 23.

In addition, the module 20 shown in FIG. 7 is a firm structure, so that marine transportation is possible even when the vertical module 24b shown in FIG. 4 is not located.

Figure 8:
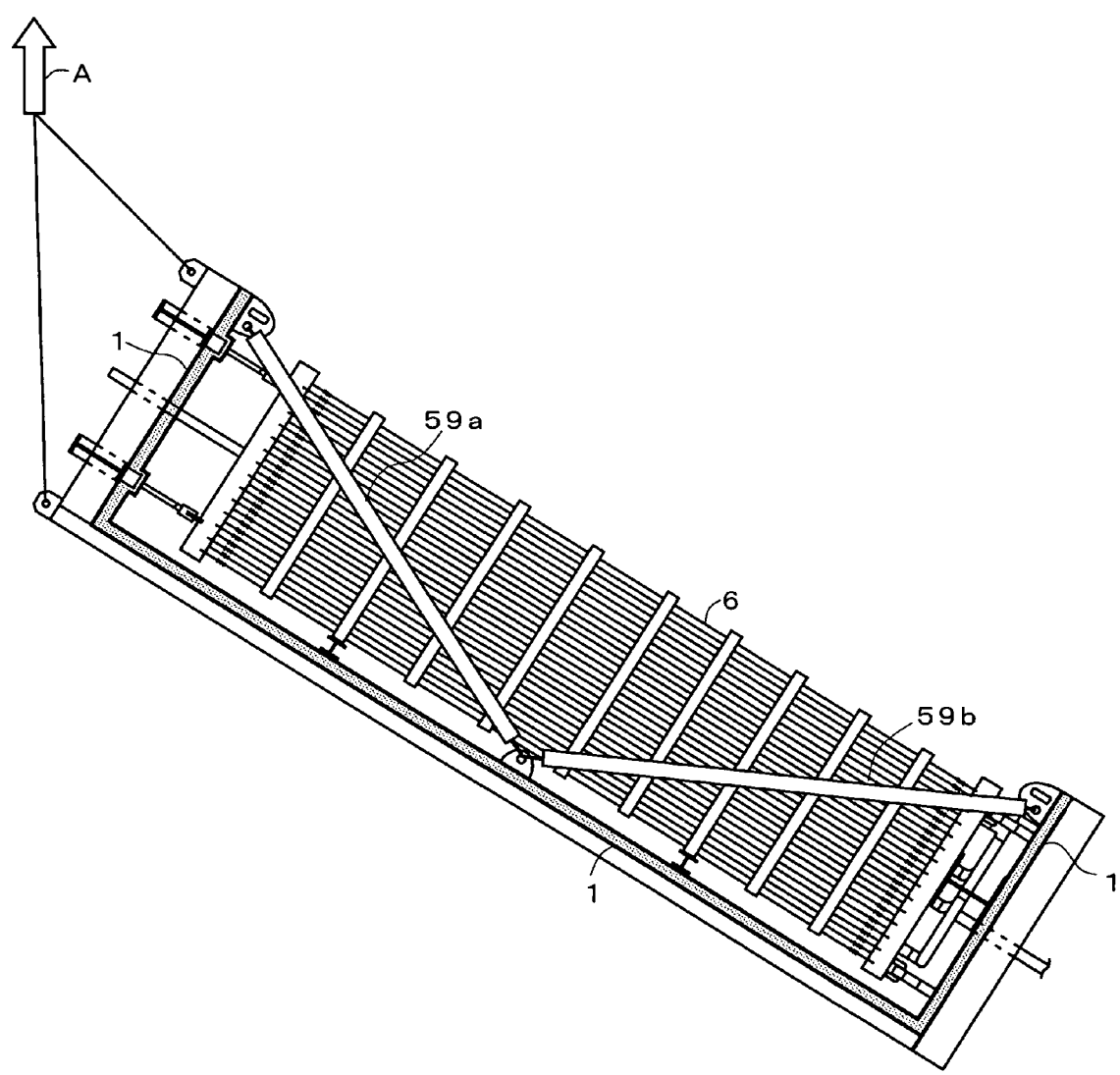
[FIG. 8] is a side view showing a state in that the heat exchanger tube bundle panel module of FIG. 7 is lifted.

FIG. 8 shows a state in that the module 20 of FIG. 7 is lifted by a crane in the direction of arrow A. In this case, a trianglar shape is also formed by the casing 1 and the first and second aseismic braces 59a and 59b, so that the casing 1 does not deform due to the lifting load, and it is not necessary to add a new structural member.

Figure 10:
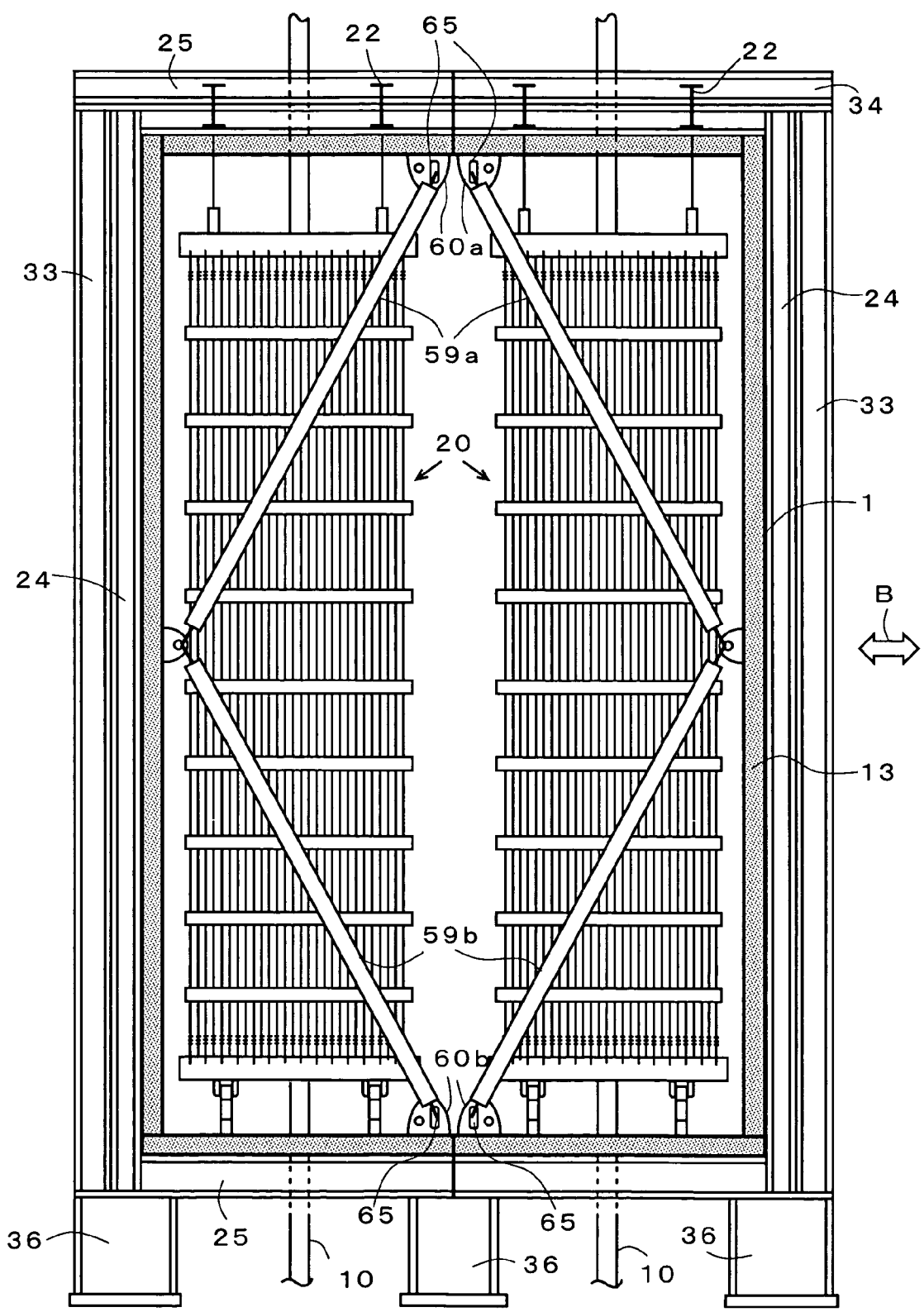
[FIG. 10] is a side view in a case where the heat exchanger tube bundle panel module of FIG. 7 is integrated with the structural members supporting the module and arranged in the direction (gas path width direction) orthogonal to the gas flow to assemble an exhaust heat recovery boiler.

FIG. 10 is a side view of an arrangement in the horizontal direction (gas path width direction) of a plane orthogonal to the gas flow when two modules 20 and 20 and structural members supporting the modules are integrated together to assemble an exhaust heat recovery boiler. After assembling the modules 20 and 20, pairs of braces 59a and 59b and 59a and 59b are inserted in the driving slots 65 of the lugs 60a and 60b and 60a and 60b. The driving slots 65 are rectangular slots, and the first and second aseismic braces 59a and 59b and 59a and 59b can be movable along the slots 65 when the boiler is driven, so that even when the first and second aseismic braces 59a and 59b and 59a and 59b thermally expand, this thermal expansion can be absorbed by the driving slots 65.

Therefore, thermal expansion of the first and second aseismic braces 59a and 59b and 59a and 59b is not restricted, and after assembling the modules 20 and 20 to the boiler main body, the work of cutting and removing the first and second aseismic braces 59a and 59b and 59a and 59b is not necessary. In addition, the four first and second aseismic braces 59a and 59b and 59a and 59b form a diamond shape, and play a role in preventing deformation of the casing 1 when the exhaust heat recovery boiler receives a seismic force in the horizontal direction of the arrow B.

FIG. 9 shows an example of one module 20 that is a block of five heat exchanger tube bundle panels 23. Each heat exchanger tube bundle panel 23 is formed by joining the upper header 7 and the lower header 8 by three-row heat exchanger tubes 6. The heat exchanger tubes 6 are fixed by hanging supports 11 that link the lug 57 attached to the upper header 7 and the casing 1. In addition, the transporting spacer 63 prevents the heat exchanger tube bundle panels 23 from moving in the paper surface transverse direction of FIG. 9. Between the lower header 8 and the wall face structure formed by the lower casing 1, the liner 12, and the thermal insulating material 13, a panel aseismic devices 31 that have a structure for adapting to vertical thermal elongation and preventing vibrations in the forward and rearward directions are located.

Figure 11:
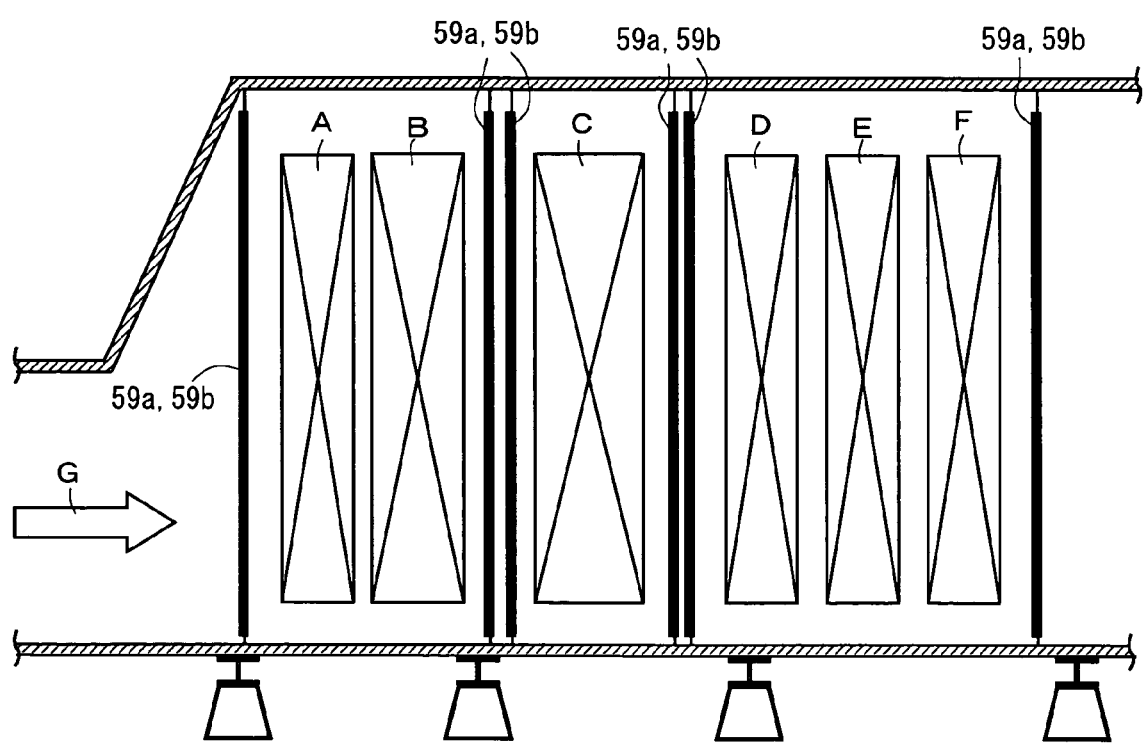
[FIG. 11] is a side view of the entire structure of an exhaust heat recovery boiler to which the heat exchanger tube bundle panel module of FIG. 7 is applied.

FIG. 11 is a side view of the entire structure of an exhaust heat recovery boiler to which the heat exchanger tube bundle panel module 20 is applied according to this embodiment. In the example shown in FIG. 11, in order from the upstream side to the downstream side of the inside of the exhaust gas duct, a superheater A, a high-pressure evaporator B, denitration equipment C, a high-pressure economizer D, a low-pressure evaporator E, and a low-pressure economizer F are located.

For the superheater A and the high-pressure evaporator B, one heat exchanger tube bundle panel module 20 is located each forward and rearward of the gas flow direction, respectively, and also for the high-pressure economizer D and the low-pressure economizer F, one heat exchanger tube bundle panel module 20 is each located forward and rearward of the gas flow direction, respectively. In the front side of the gas flow direction of the module 20 of the superheater A, the first and second aseismic braces 59a and 59b are located, and on the rear side of the gas flow direction of the module 20 of the high-pressure evaporator B, the first and second aseismic braces 59a and 59b are located.

Likewise, the first and second aseismic braces 59a and 59b are located on the front side of the gas flow direction of the module 20 of the high-pressure economizer D, and on the rear side of the gas flow direction of the module of the low-pressure economizer F, the first and second aseismic braces 59a and 59b are located.

The necessary number of the first and second aseismic braces 59a and 59b for the entire heat recovery boiler are installed, and in the forward and rearward of the gas flow direction of the low-pressure evaporator E of this embodiment, it is not necessary to dispose the first and second aseismic braces 59a and 59b, so that these are not located. Furthermore, in the forward and rearward of the gas flow direction of the denitration equipment C, as a denitration equipment module different from the heat exchanger tube bundle panel module 20 of the invention, the first and second aseismic braces 59a and 59b are located, or different type aseismic braces are used.

As described above, when an exhaust heat recovery boiler is constructed by using the module 20 of FIG. 7 and FIG. 9, the first and second aseismic braces 59a and 59b and 59a and 59b are located, so that the first and second aseismic braces 59a and 59b and 59a and 59b can be commonly used as reinforcing members when transporting or lifting. The material costs and manufacturing costs of the reinforcing members of the module 20 and cutting and removing costs of the reinforcing members after the boiler is constructed become unnecessary, and the costs of the exhaust heat recovery boiler can be significantly lowered. Thereby, the construction costs of the combined cycle power generation facilities can be reduced, and this leads to reduction in power generation unit costs.

It is also possible that the module 20 of FIG. 7 and FIG. 9 and the module 20 from which the module frames 24b, 24c, and 24d shown in FIG. 4, have been removed, are mixed to assemble the heat exchanger tube bundle panels 23 of the exhaust heat recovery boiler.

Figure 12:
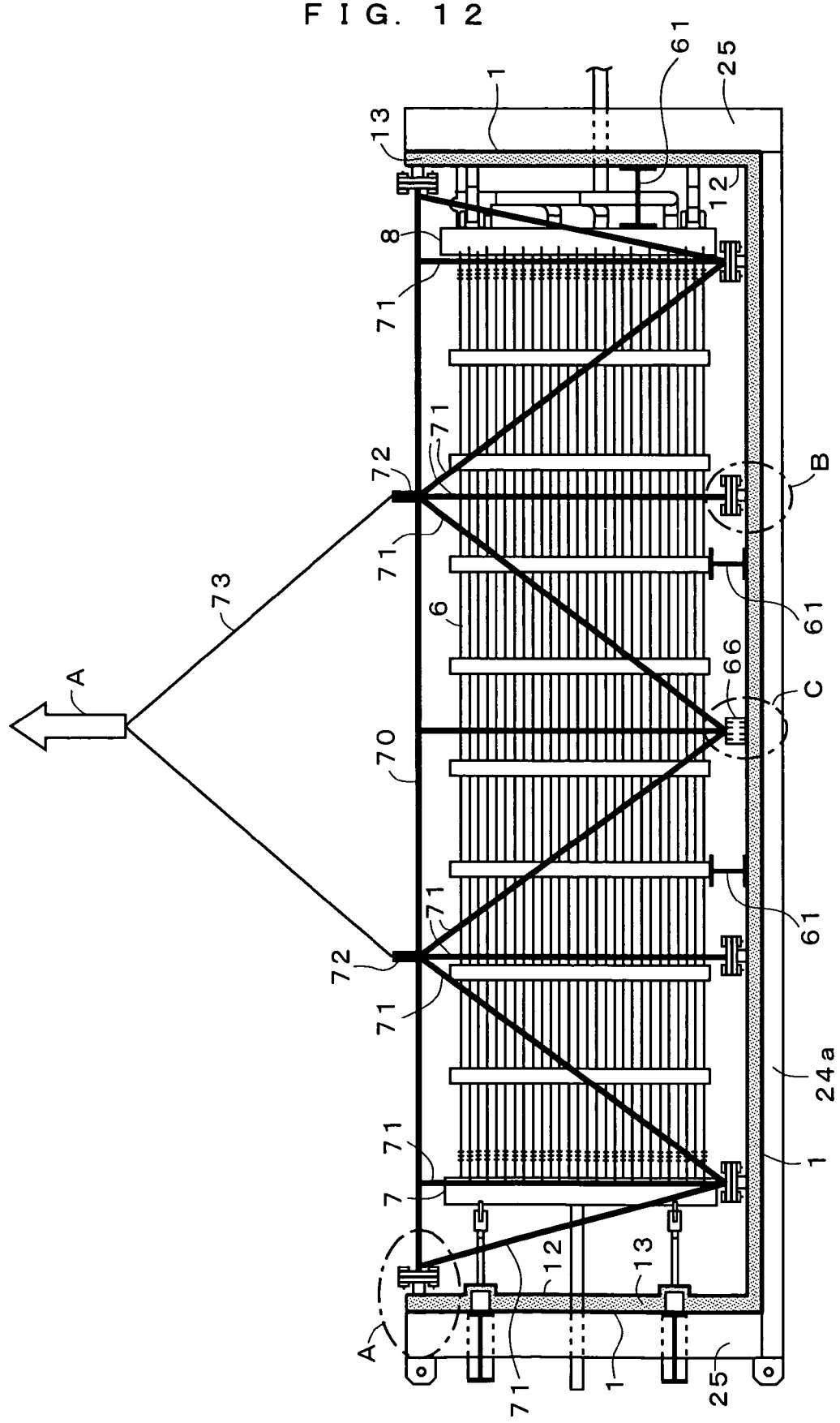
[FIG. 12] is a side view of a heat exchanger tube bundle panel module of a third embodiment of the invention.

FIG. 12 is a side view of a heat exchanger tube bundle panel module 20 of a third embodiment of the invention.

This module 20 is transported by laying the side wall face horizontally, so that a horizontally-laid side surface is shown in FIG. 12. Inside the casing 1 including a lamination of the liner 12 and the thermal insulating material 13 inside (the casing 1 formed by laminating the liner 12 and the thermal insulating material 13 may be simply referred to as a casing), heat exchanger tube bundle panels 23 each including a number of heat exchanger tubes 6, an upper header 7 and a lower header 8 thereof, and vibration restraining supports 18, etc., are contained.

Between the heat exchanger tube bundle panels 23 and the casing 1, transporting spacers 61 for fixing the heat exchanger tube panels 23 during transportation are installed between the vibration restraining support 18 and the casing 1 and between the lower header 8 and the casing 1.

On the inner surfaces of the ceiling side casing 1 and the bottom side casing 1, transporting reinforcing members 70 and 71 having truss structures are installed. The end portion inner surface of the ceiling wall side casing 1 and the end portion inner surface of the bottom wall side casing 1 are connected by the first transporting reinforcing member 70, and the inner surface of the bottom wall side casing 1 and the first transporting reinforcing member 70 are connected by a plurality of ladder-shaped and cater-cornered second transporting reinforcing members 71.

To the first transporting reinforcing member 70 that couples the ends of the ceiling wall side casing 1 and the bottom wall side casing 1, a pair of lugs 72 and 72 are attached, and the module 20 becomes able to be lifted in the direction of the arrow A by the wire 73 connected to the lugs 72 and 72.

Figure 13:
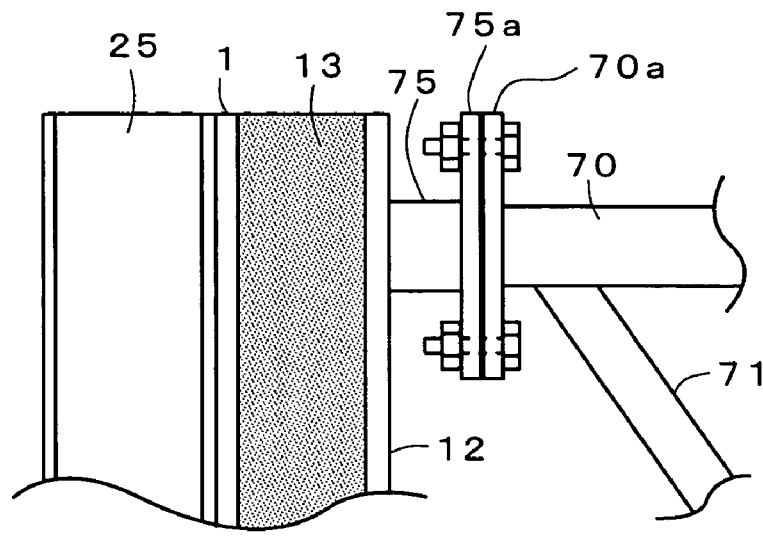
[FIG. 13] is a detailed view of part A of FIG. 12.

A detailed view of the part A of FIG. 12 is shown in FIG. 13. The support plate 75 located on the ceiling wall side casing 1 and the first transporting reinforcing members 70 are attached with transporting reinforcing member fixing flanges 75a and 70a, respectively, and the first transporting reinforcing member 70 is bolt-coupled to the ceiling wall side casing 1 by the transporting reinforcing member fixing flanges 75a and 70a. The bottom wall side casing 1 and the transporting reinforcing member 70 are also bolt-coupled at the flange portions although this is not shown.

Figure 14:
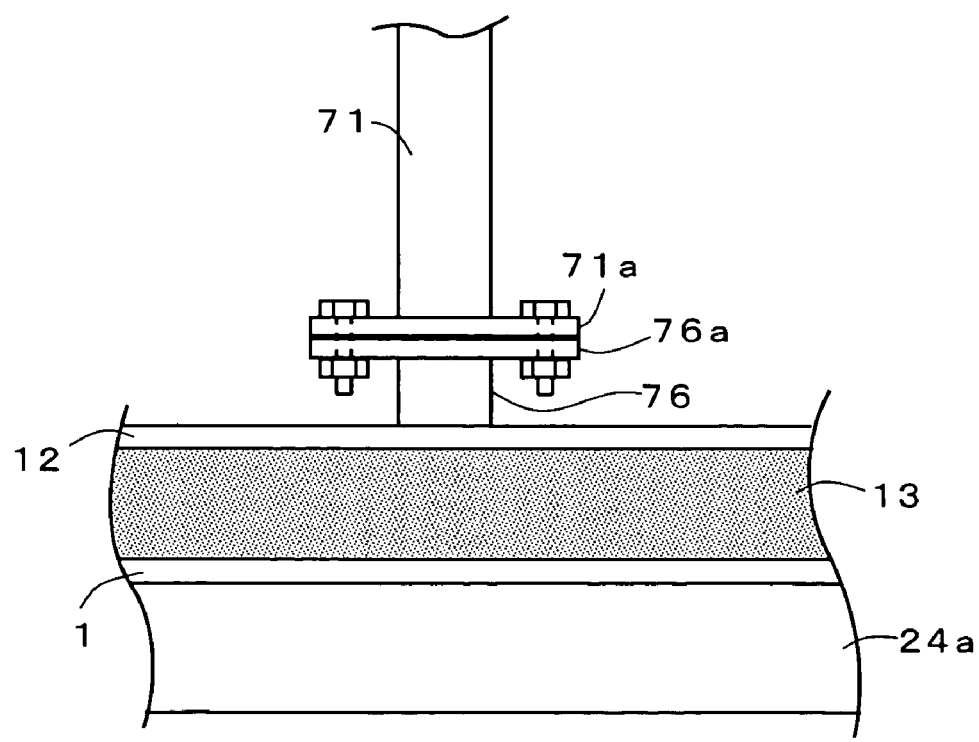
[FIG. 14] is a detailed view of part B of FIG. 12.

FIG. 14 is a detailed view of the part B of FIG. 12. To the side wall side casing 1, the supporting plate 76 is fixed, and to the other end of the supporting plate 76 and the second transporting reinforcing member 71, flanges 76a and 71a are attached, respectively, and the second transporting reinforcing member 71 is bolt-coupled to the side wall side casing 1 by the flanges 16a and 71a.

FIG. 15 shows the details of the part C of FIG. 12. To the side wall side casing 1, a transporting reinforcing member fixing guide 66 is attached, and into this guide 66, a second transporting reinforcing member 71 is fitted, and the second transporting reinforcing member 71 is restricted in movement other than movements in the axial direction.

The heat exchanger tube bundle panel module 20 shown in FIG. 12 is transported by laying it horizontally, and during transportation, great vibration loads are applied forward and rearward, leftward and rightward, and upward and downward, and the reinforcing members 70 and 71 are integrated with the ceiling wall side, the bottom wall side, and the side wall side casings 1 by the fitting type transporting reinforcing member guide 66 and the reinforcing member fixing flanges 70a and 75a and 71a and 76a, and it can be prevented that the casing 1 deforms or is damaged by the vibration loads.

During transportation of the module 20, as shown in FIG. 12, in some cases, the wire 73 is hooked on the lug 72 and the modules are lifted, and the load that acts at this time reaches the maximum when the boiler of the modules 20 is installed. As shown in FIG. 12, the results of investigation regarding the loading directions that act on the transporting reinforcing members 70 and 71 when the module 20 is lifted are shown in FIG. 16.

Figure 16:
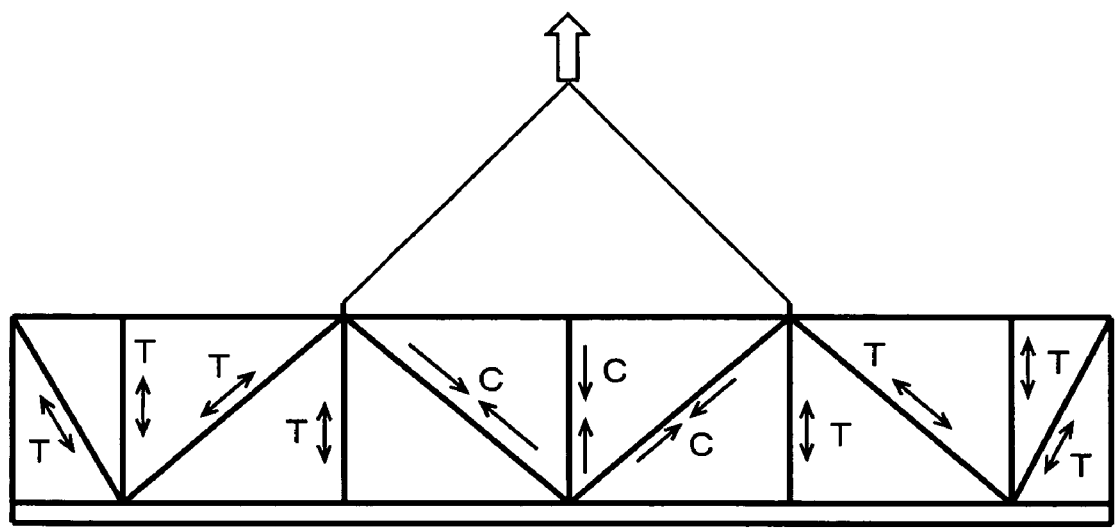
[FIG. 16] shows a load applied state when the module of FIG. 12 is lifted.

In FIG. 16, the arrow T indicates that an axial force is generated in the tension direction, and the arrow C indicates that an axial force is generated in the compression direction. In this embodiment, the method of coupling the reinforcing members 70 and 71 and the casing 1 so as to make the removal of the transporting reinforcing members 70 and 71 easiest by considering the directions of the two axial forces is determined.

Namely, for the part C of FIG. 12 where only a compressive load acts, a fitting type coupling method is used. Since only a compressive load acts on the part C, the transporting reinforcing member 70 does not come out of the side wall casing 17, and it becomes possible to remove the transporting reinforcing members 70 and 71 from the casing 1. Since a tensile axial force acts on the part B, bolt coupling is used which can resist against a tensile load and is most easily removed.

To remove the transporting reinforcing members 70 and 71 after the modules 20 are installed into the main frames (main columns 33, main beams 34, and bottom columns 36, etc.) of the boiler structure, the bolts of the transporting reinforcing member fixing flanges 70a and 75a and 71a and 76a shown in FIG. 12 are loosened and removed, whereby the transporting reinforcing members are easily removed.

Figure 17:
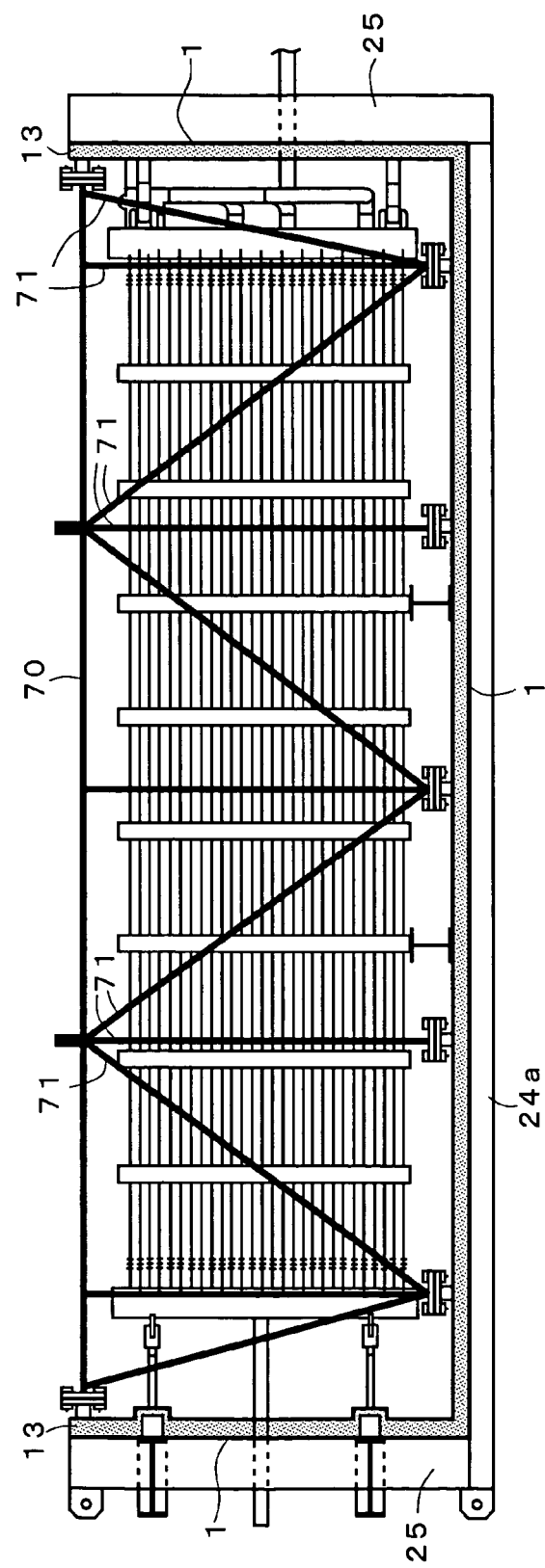
[FIG. 17] is a side view of a modified example of the module of FIG. 12.

FIG. 17 shows an example in which bolt coupling using a flange structure is employed for all connecting portions between the transportation reinforcing members 70 and 71 and the casing 1 shown in FIG. 12. In this case, since bolt coupling is applied to all connecting portions between the transportation reinforcing members 70 and 71 and the casing 1, the reinforcing members 70 and 71 and the casing 1 are firmly connected regardless of the direction the module 20 is turned toward during transportation, in particular, when it is lifted, and these connecting portions are disconnected by only removing the bolts, and therefore, the transportation reinforcing members 70 and 71 can be easily removed.

Thus, in this embodiment, it becomes possible to easily remove the transporting reinforcing members 70 and 71 after the heat exchanger tube bundle panel modules 20 are installed into the main frames of the boiler structure of the exhaust heat recovery boiler, and the construction costs of the exhaust heat recovery boiler can be reduced. Thereby, the construction costs of the combined cycle power generation facilities can be reduced, so that an effect of reduction in power generation unit costs is obtained.

Next, procedures for installing the heat exchanger tube bundle panel modules 20 to the main frames such as the main columns 33, the main beams 34, and the bottom columns 36, etc., at the heat recovery boiler construction site are described.

Figure 18:
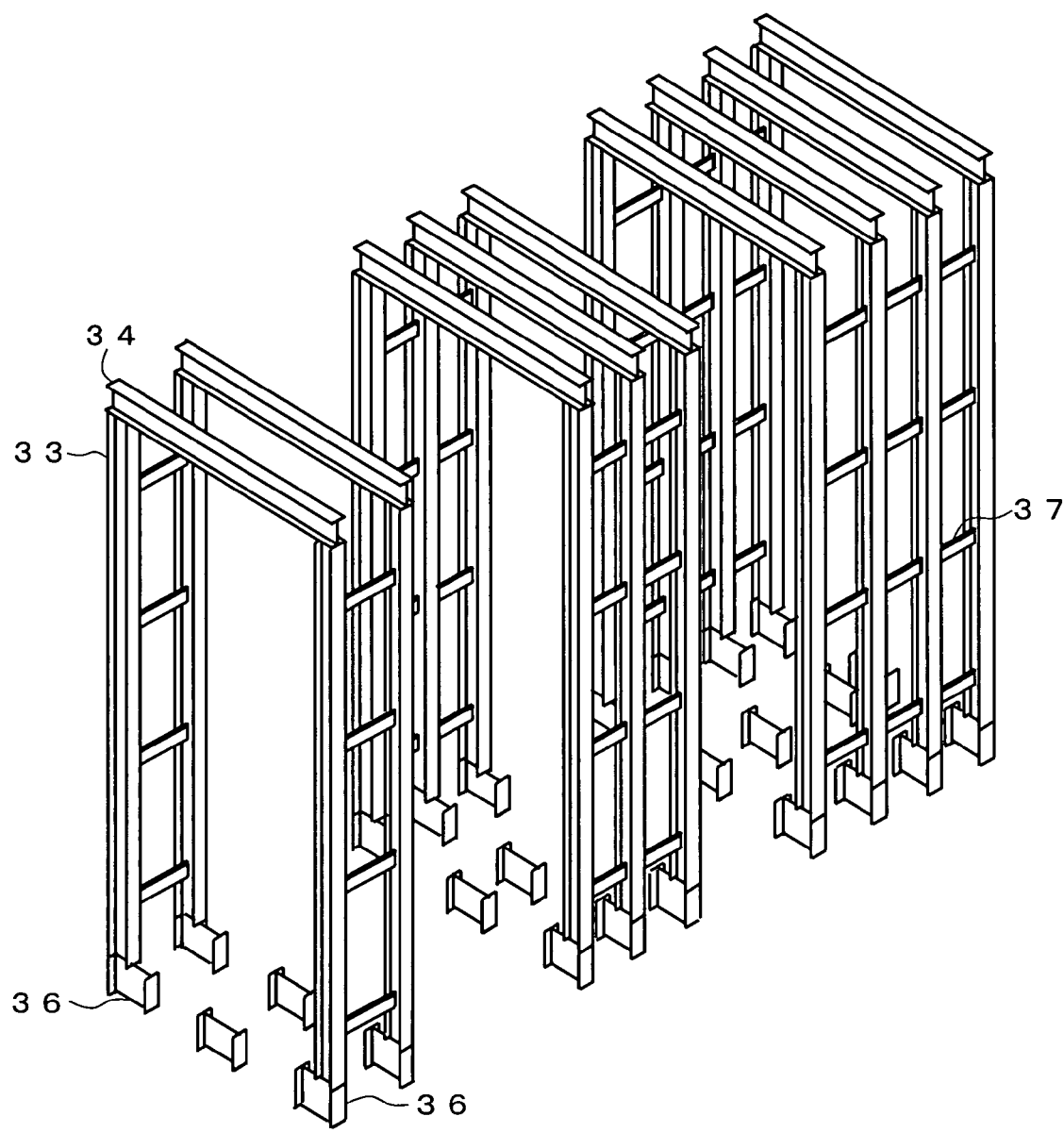
[FIG. 18] is a perspective view of main columns, bottom wall columns, and main beams as structural members of the horizontal exhaust heat recovery boiler assembled in advance at the heat recovery boiler construction site according to an embodiment of the invention.

At the heat recovery boiler construction site, as shown in the perspective view of FIG. 18, wide bottom columns 36 are located in advance, and on the bottom columns 36, the main columns 33 and the main beams 34 are constructed. When the installing positions of the main columns 33 and the main beams 34 are determined, the side supports 37 that connect adjacent main columns 33 to each other are located to make the retaining of the main columns 33 and the main beams 34 more firm.

The width in the horizontal direction (gas path width direction) of the bottom wall column 36 is set wider than the width of the main column 33 to be disposed above it, and when two modules 20 are disposed adjacent to each other in the width direction of the gas duct shown in FIG. 18, the bottom wall corners of the two modules 20 can be simultaneously placed on the central bottom wall column 36. On the two bottom wall columns 36 on the side wall side, the other side bottom wall corners of the two modules 20 adjacent to each other in the gas flow direction are placed, respectively.

Figure 19:
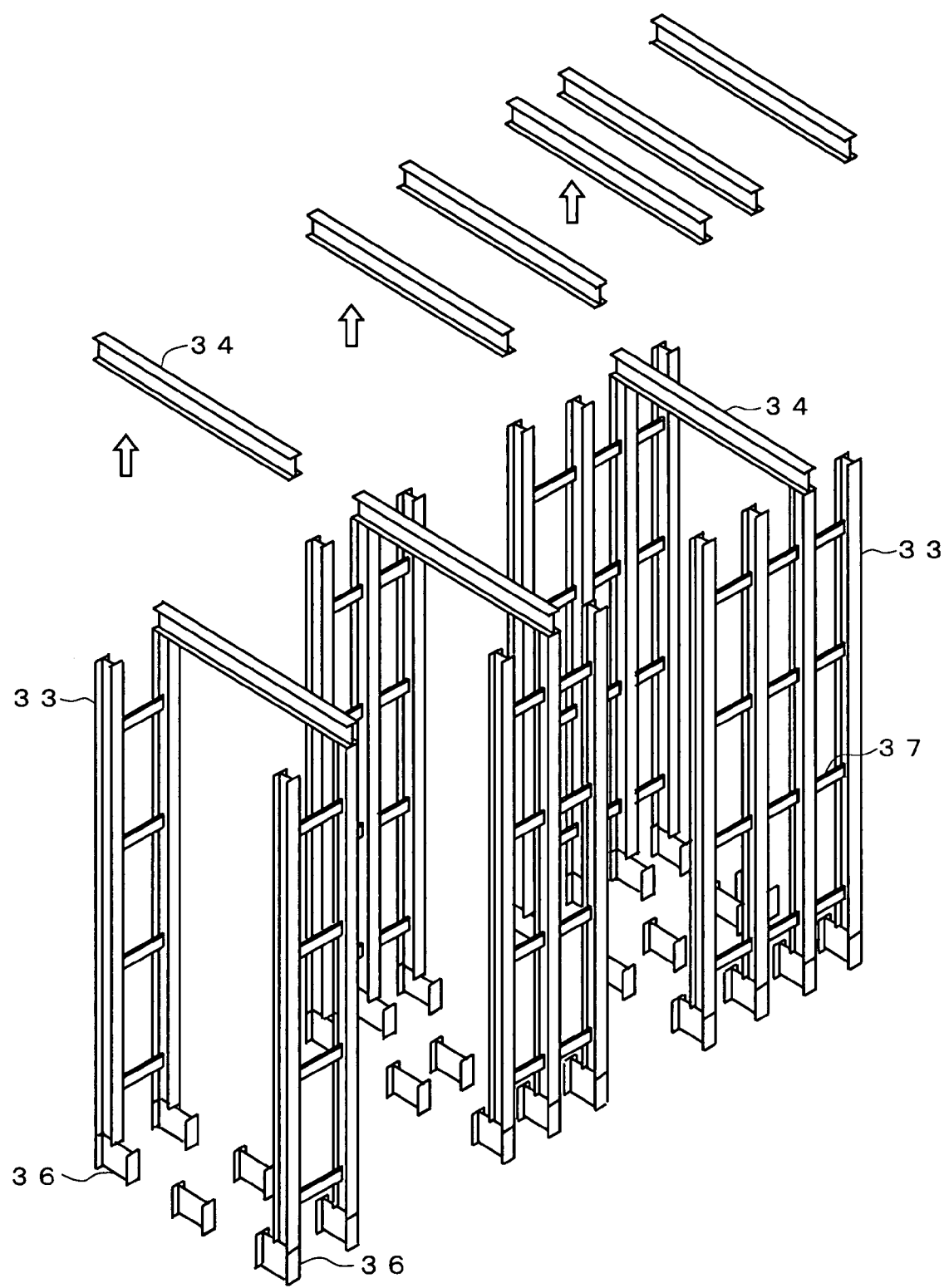
[FIG. 19] is a perspective view showing a state where a part of the main beams is removed from the structural members of FIG. 18.
Figure 20:
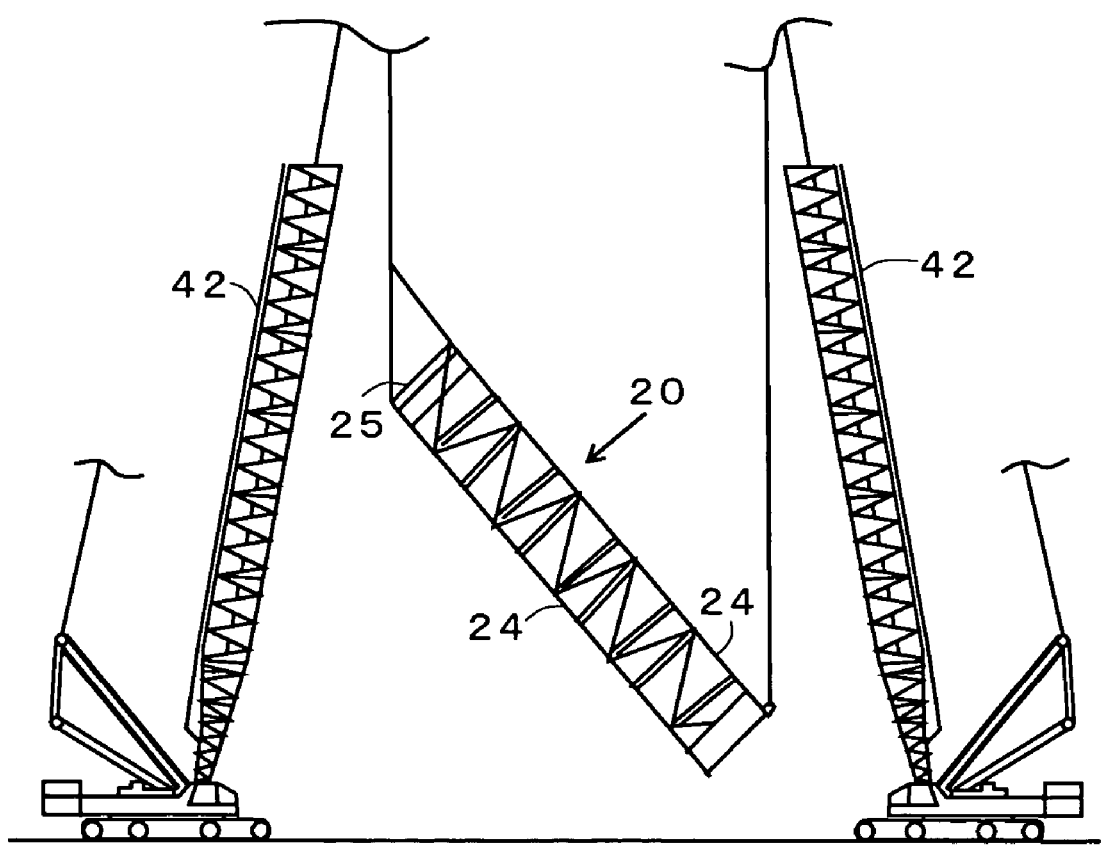
[FIG. 20] is a drawing showing a state where the heat exchanger tube bundle panel module of FIG. 4 is lifted.
Figure 22:
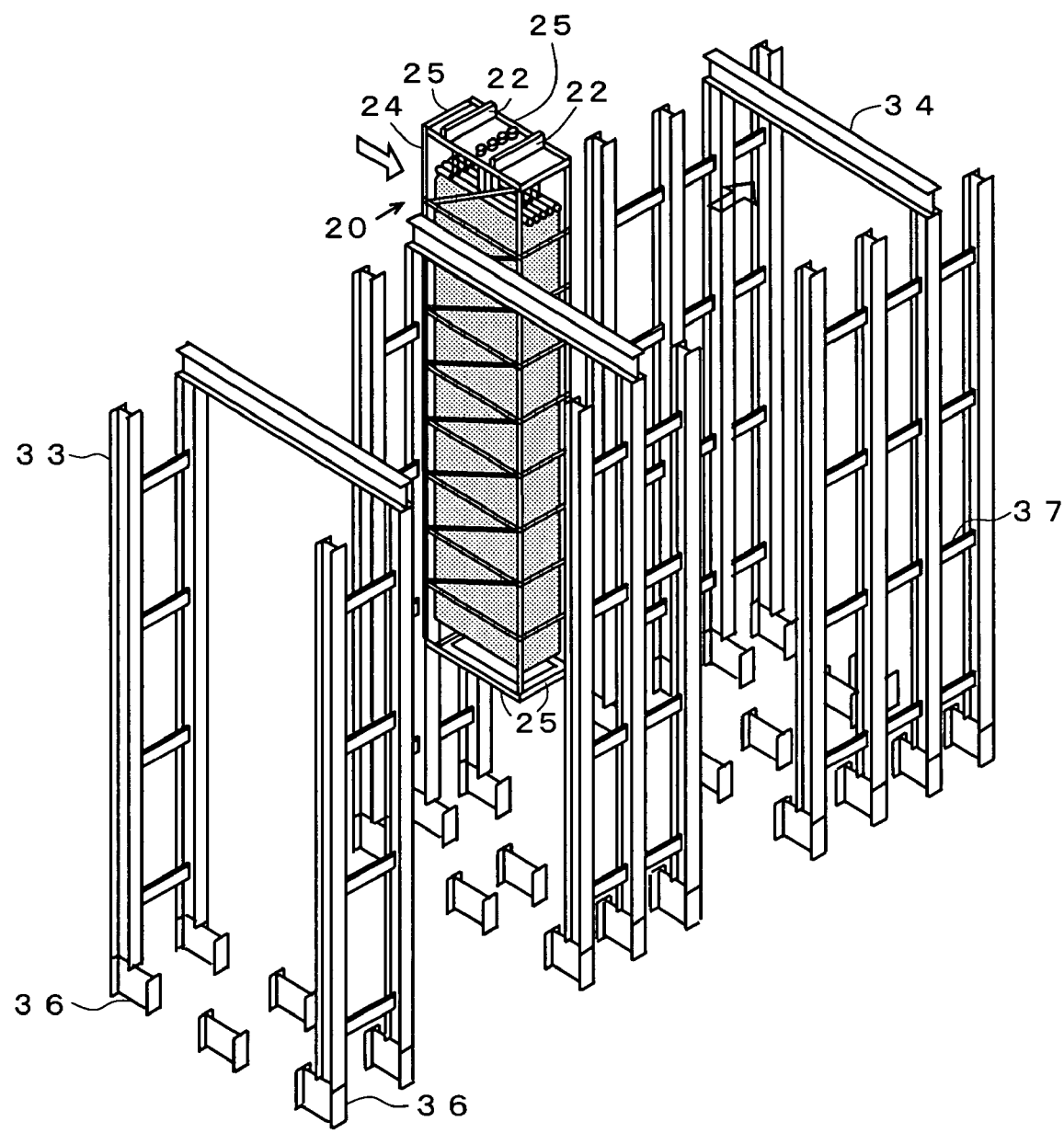
[FIG. 22] is a perspective view showing procedures of attaching the heat exchanger tube bundle panel module of FIG. 4 between structural members.

Next, as shown in the perspective view of FIG. 19, before installing the modules 20 into the heat recovery boiler structural members including the main columns 33, the main beams 34, the bottom wall columns 36, and the side supports 37, some of the main beams 34 are removed and appropriate points of the ceiling wall side and the bottom wall side of the module frames 24 and 25 are lifted by a crane 42 and the modules 20 are located between the adjacent main columns 33 in order as shown in the plan view of FIG. 21 and the perspective view of FIG. 22.

Also in this case, the module frames 24 and 25 of the modules which become a part of the main columns 33 and the main beams 34 are located outside the casing 1, so that there is no possibility that the modules 20 deform due to structural shortage when they are lifted by the crane 42. However, when lifting the modules 20, if they are lifted while a part of the modules 20 is in contact with the ground, an unexpected load is applied to the ground contact portion and it may deform, so that it is necessary that the module 20 is inserted between the two main columns 33 as shown in FIG. 21 and FIG. 22 while being lifted so that the ceiling wall and the bottom wall of the casing 1 of the module 20 do not come into contact with the ground together with the crane 42, and then hang down from the main beam 34.

Figure 23:
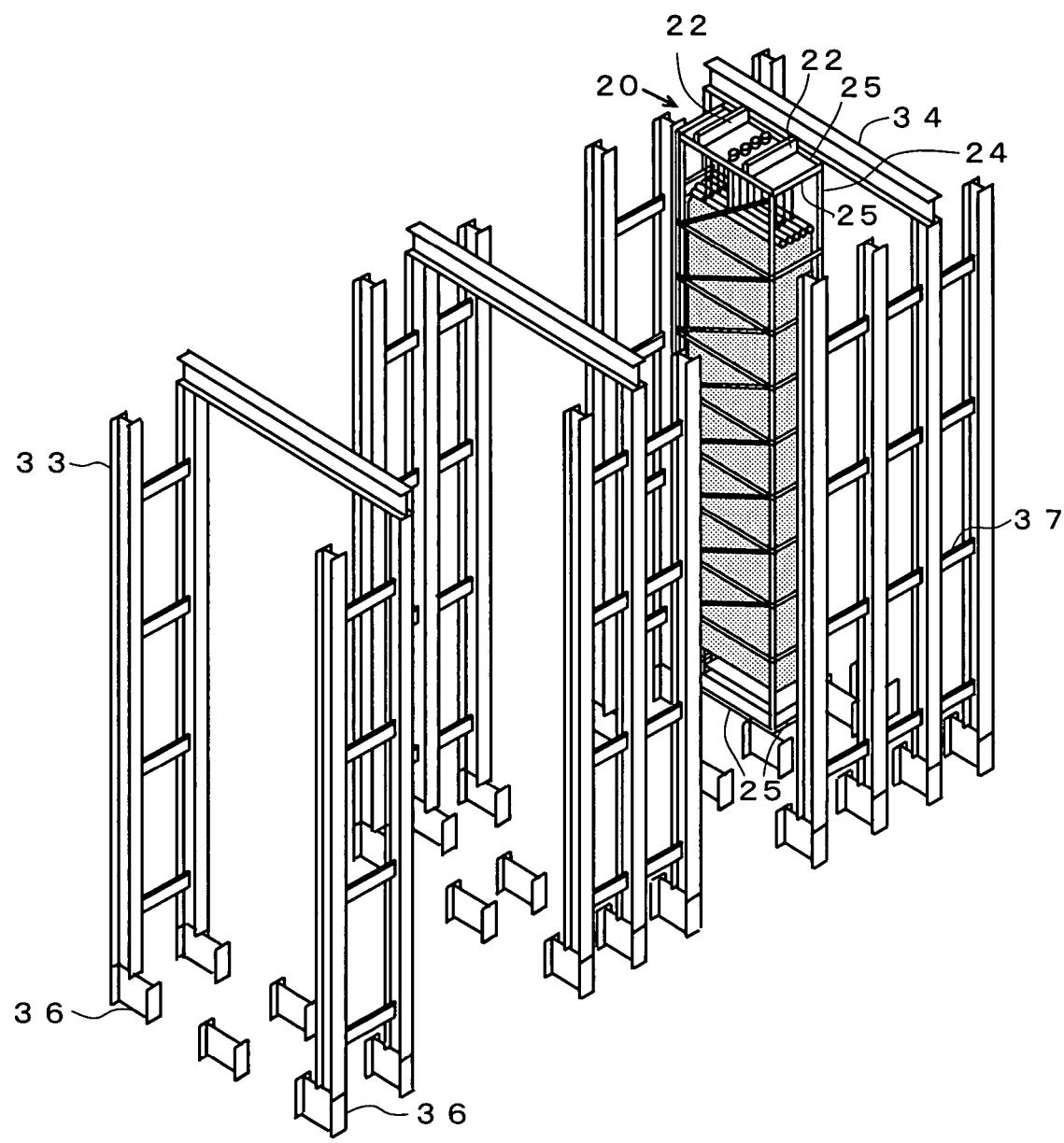
[FIG. 23] is a perspective view showing procedures of attaching one heat exchanger tube panel modules of FIG. 4 between structural members.

As shown in FIG. 21 and FIG. 22, the module 20 is inserted between the two main columns 33 disposed in the forward and rearward direction as the gas flow direction, where no side support 37 is located, and disposed at a predetermined position as shown in FIG. 23, and the upper part of the module 20 is connected to the main beam 34 on the rear side. Next, as shown in the perspective view of FIG. 24, the module 20 to be located adjacent to the above-described module 20 is also inserted between two main columns 33 and connected to the main beam 34 on the rear side in the same manner. Thereafter, the upper parts of the two modules 20 are connected to the main beams 34 on the front side.

Figure 24:
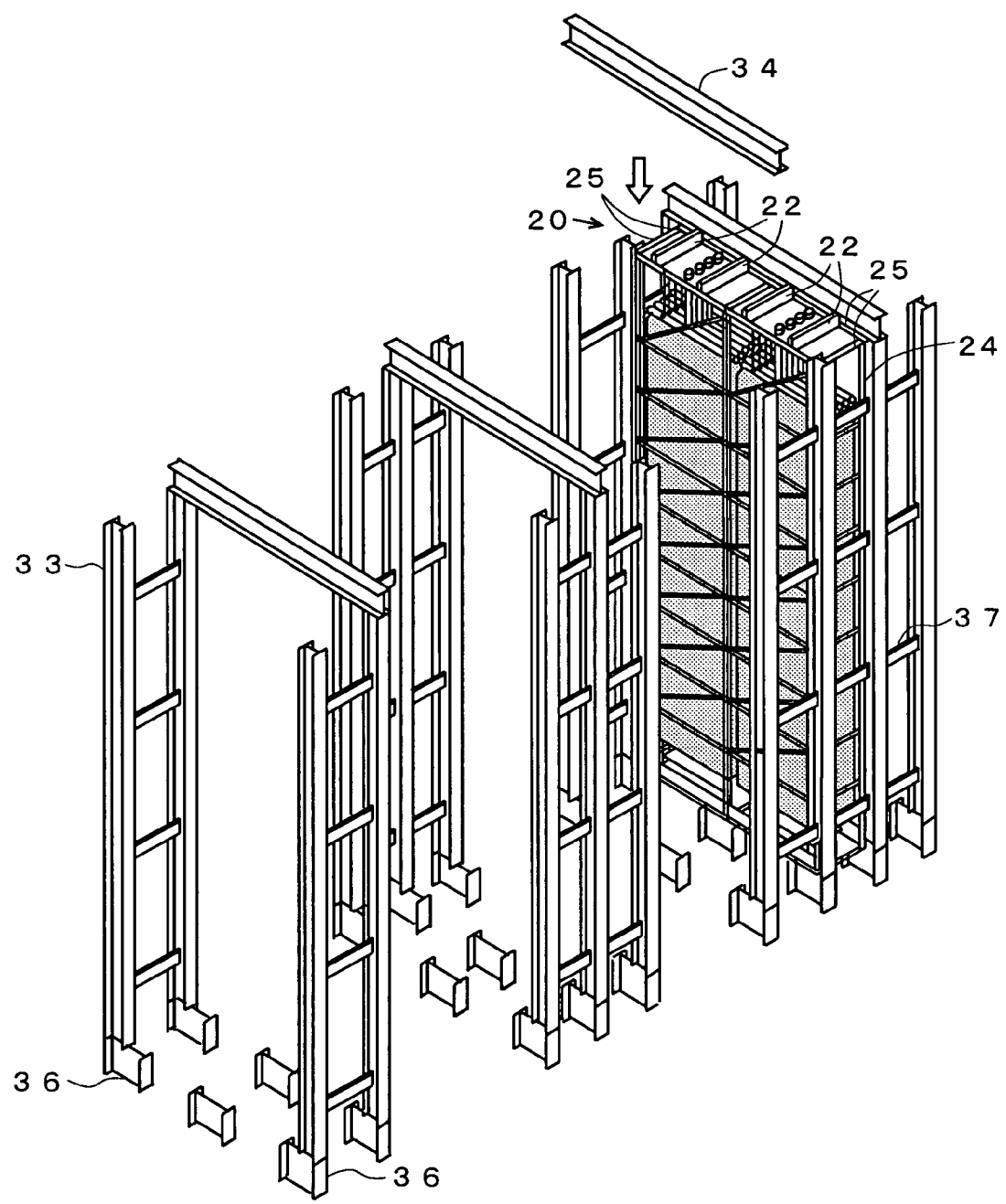
[FIG. 24] is a perspective view showing processing of attaching two heat exchanger tube bundle panel modules of FIG. 4 between structural members.

Since FIG. 22 through FIG. 24 show the case where the heat exchanger tube bundle panel modules 20 shown in FIG. 4 are installed, and after the upper parts of the two modules 20 structured as shown in FIG. 4 are connected to the main beams 34 of the front side in the state of FIG. 24, the reinforcing module frames 24c and the brackets 24d must be removed.

When the modules 20 structured as shown in FIG. 7 are connected to the main columns 33 and the main beams 34, the first and second aseismic braces 59a and 59b are not removed but are used as they are as structural members of the exhaust heat recovery boiler.

Furthermore, when the modules 20 structured as shown in FIG. 12 are connected to the main columns 33 and the main beams 34, after the upper parts of the two modules 20 are connected to the main beams 34 on the front side in the state of FIG. 24, the first transporting reinforcing member 70 and the second transporting reinforcing member 71 must be removed.

Figure 25:
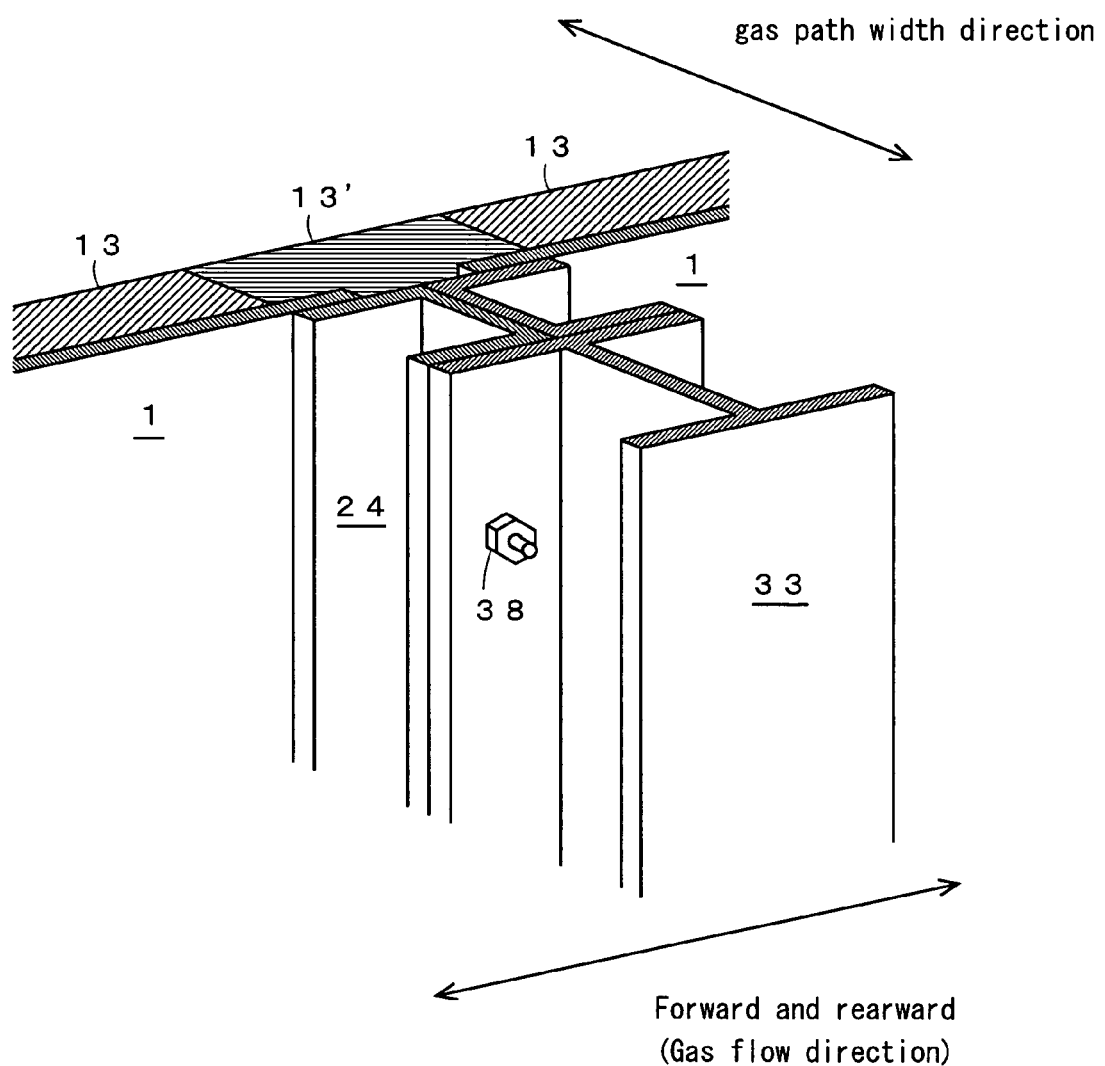
[FIG. 25] is a perspective view of a section cut along the D-D line of FIG. 2.

At a proper position shown in FIG. 25 (perspective view of the section cut along the D-D line of FIG. 2), the vertical module frame 24 is connected to the main column 33 by bolt and nut 38 and welding, and as shown in FIG. 26 (perspective view including sections cut along two vertical directions inside the module 20 of the oval area B of FIG. 2), the horizontal module frame 25 is connected to the main beam 34 by bolt and nut 38 and welding.

Figure 27:
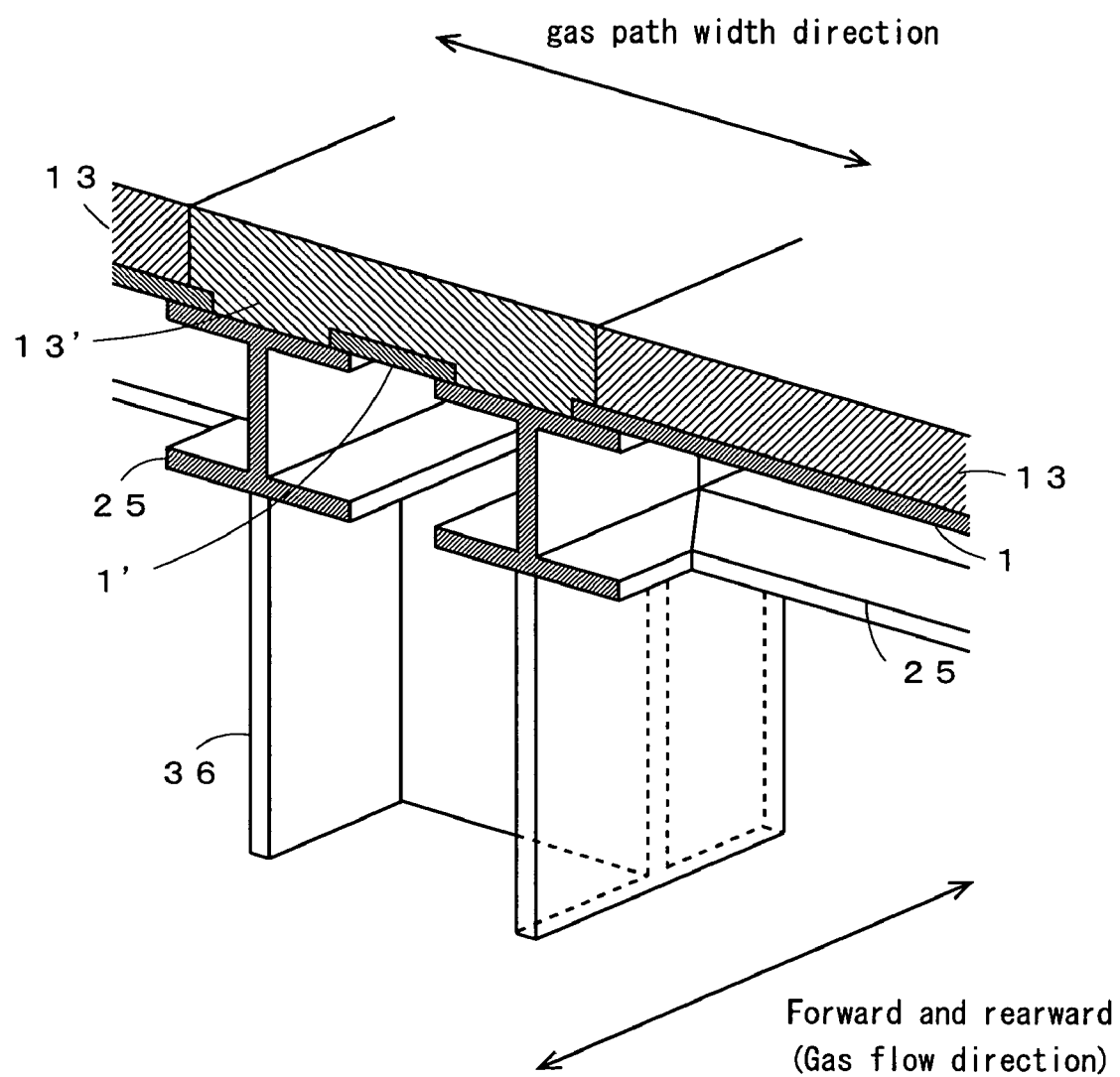
[FIG. 27] is a perspective view of a section cut along the vertical direction inside the heat exchanger tube bundle panel module of the oval area A of FIG. 2.

Furthermore, as shown in FIG. 27 (perspective view including a section cut vertically inside the module 20 of the oval area A of FIG. 2) that shows the adjacent portions to each other of the horizontal module frames 25 of the two modules 20 arranged in the direction (referred to as the width direction) orthogonal to the gas flow of the gas duct, the horizontal module frames 25 of the modules 20 are placed on one bottom wall column 36 together.

In FIG. 28 (perspective view including the sections cut along two vertical directions inside the module 20 of the oval area C of FIG. 2), two modules 20 to be located in parallel in the width direction of the gas duct and horizontal module frame 25 portions of the two modules 20 to be disposed adjacent to each other in the gas flow direction of the gas duct are shown.

In the perspective views of FIG. 25 through FIG. 28, the vertical and horizontal module frames 24 and 25 are connected to the main columns 33 and the main beams 34 by welding or the like, and in the gap between the adjacent modules 20, a thermal insulating material 13' and/or a casing 1' (the liner 12 is not shown) is filled.

A side view from the gas flow direction after the two modules 20 to be disposed in parallel in the width direction of the gas duct are welded and connected to the heat recovery boiler structural members (the main columns 33, the main beams 34, the bottom wall columns 36, and the side supports 37) is as shown in FIG. 2.

Thus, when the heat exchanger tube bundle panel modules 20 are installed at the heat recovery boiler construction site, installation of the heat exchanger tube bundle panels 23 is completed as well as the casing 1 of the heat recovery boiler.

According to this embodiment, dangerous construction work at the inner upper side of the casing 1 of the heat recovery boiler is omitted, scaffolding setting and removal become unnecessary, and the heat exchanger tube bundle panels 23 can be installed inside the heat recovery boiler casing 1 easily and quickly, so that a heat recovery boiler can be constructed in a short period.

Figure 29:
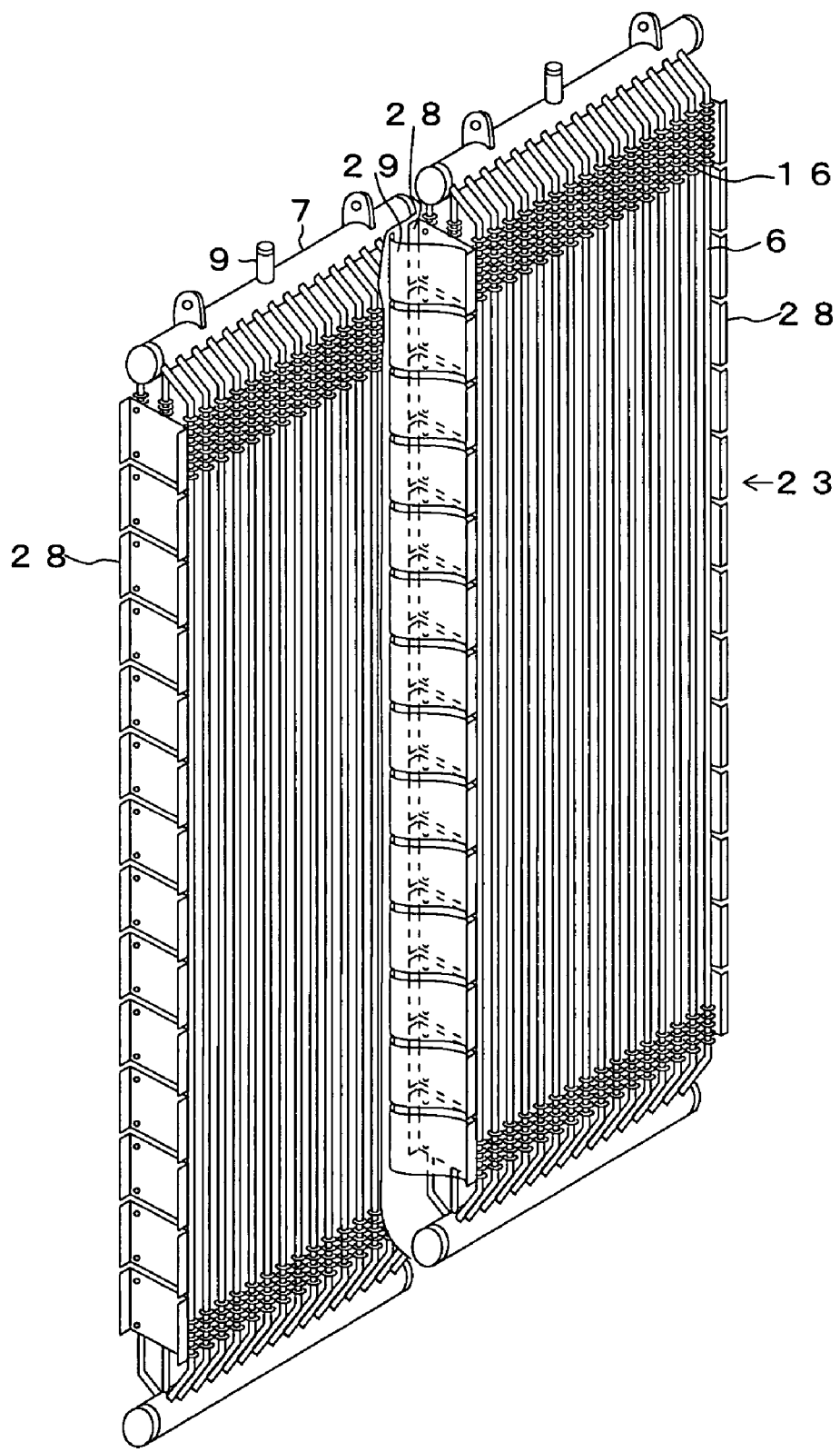
[FIG. 29] is a perspective view of heat exchanger tube bundle panels arranged in the gas path width direction of an exhaust heat recovery boiler according to an embodiment of the invention.
Figure 30:
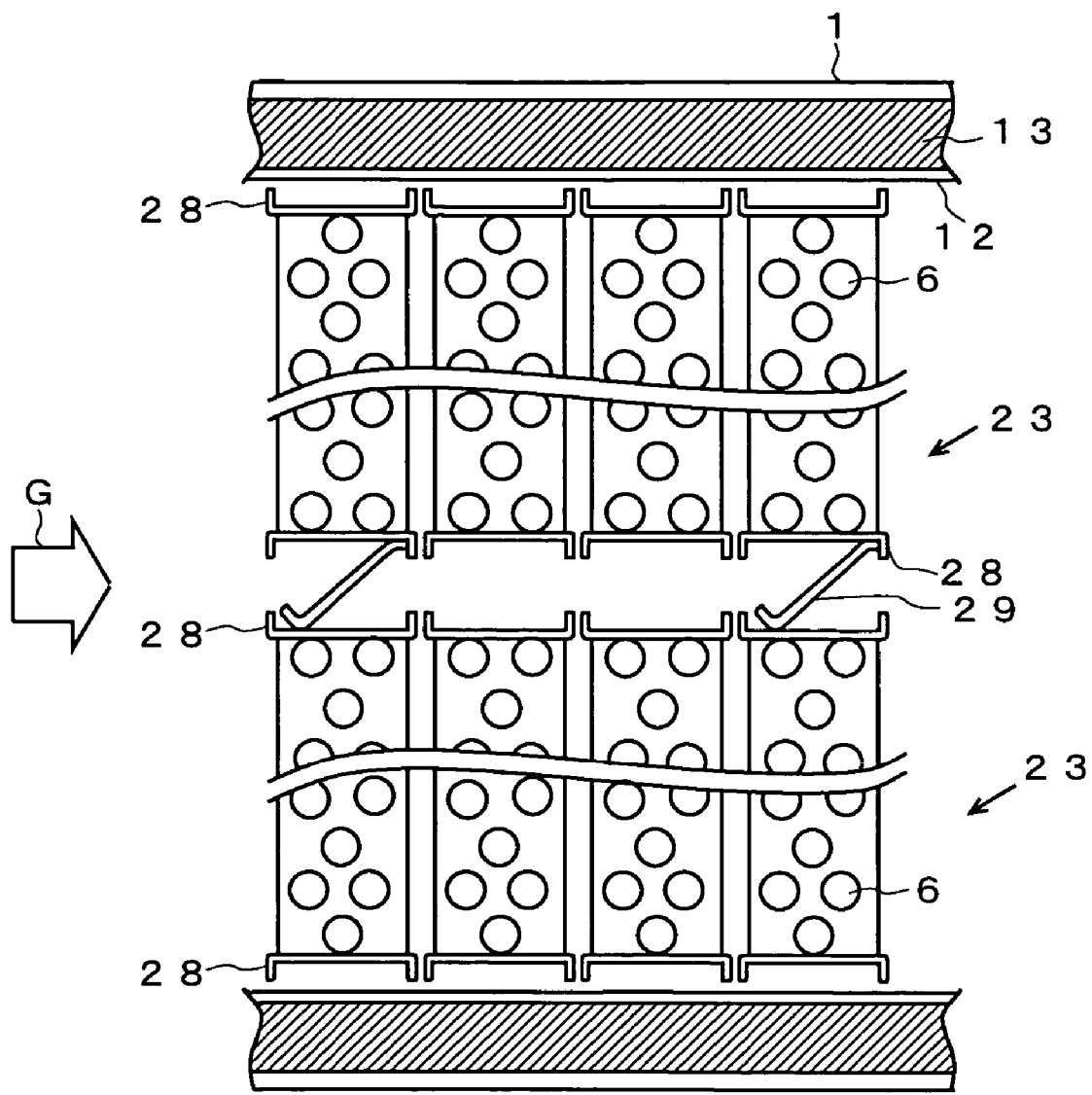
[FIG. 30] is a sectional view in the plane direction of FIG. 29.

Only the heat exchanger tube bundle panels 23 arranged parallel in the gas path width direction of the exhaust heat recovery boiler of an embodiment of the invention are shown by the perspective view of FIG. 29 and the sectional view in the plane direction of FIG. 30, wherein on the side surfaces of the heat exchanger tube bundle panels 23 along the gas flow, baffle plates 28 are located, and furthermore gas short pass preventive plates 29 that prevent gas short pass are located.

On both side surfaces of the heat exchanger tube bundle panels 23, baffle plates 28 are located to prevent gas short pass from the gaps between the heat exchanger tube bundle panels 23 and the casing 1, however, the gaps between the heat exchanger tube bundle panels 23 arranged in parallel to each other in the gas path width direction of the exhaust heat recovery boiler cannot be filled only by the baffle plates 28 as in the case of this embodiment. The reason for this is that gaps are necessary between adjacent heat exchanger tube bundle panels 23 when considering the installation operations of the heat exchanger tube bundle panels 23 and thermal elongation of the panels 23.

Figure 31:
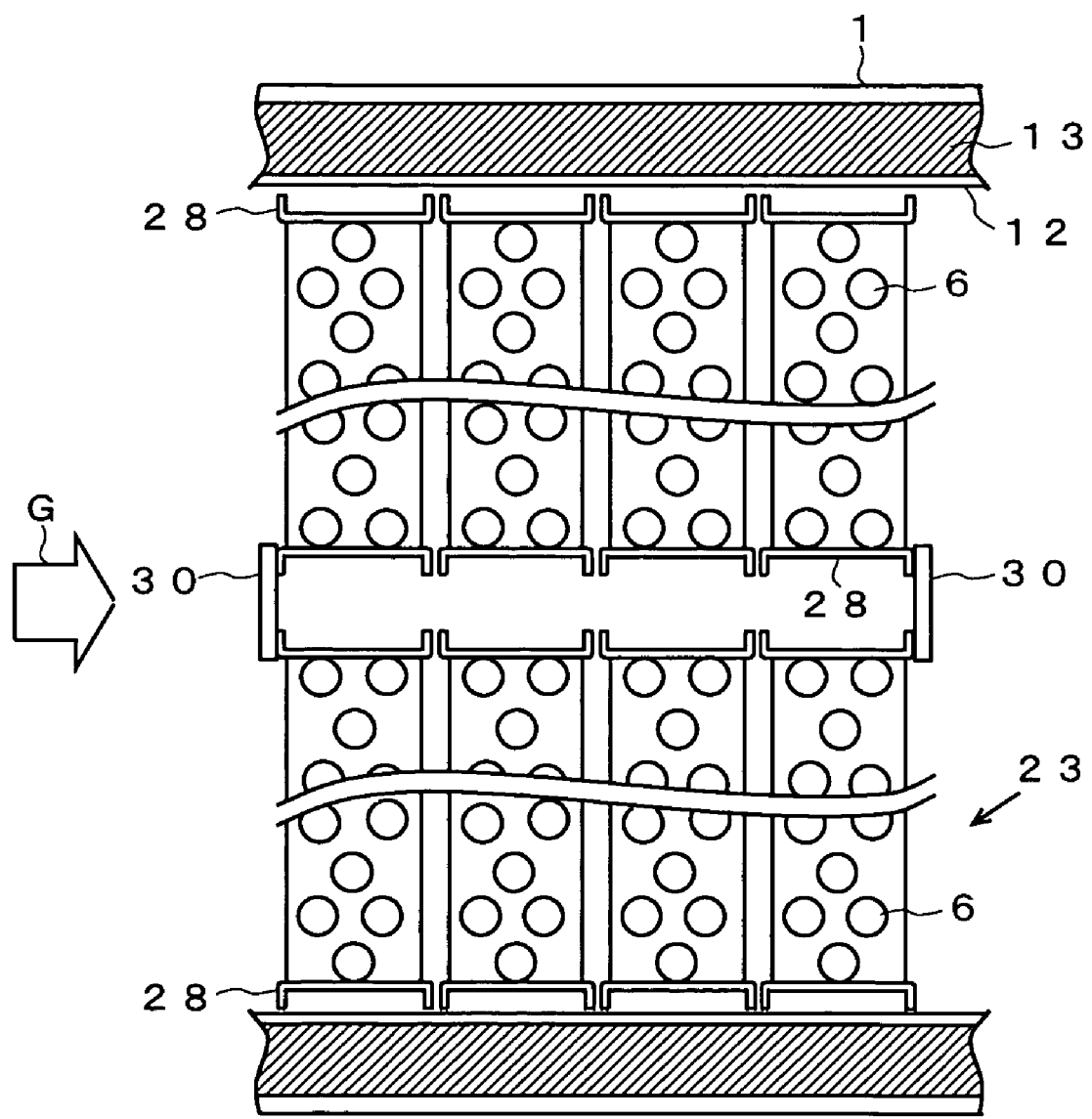
[FIG. 31] is a sectional view in the plane direction of the portion of heat exchanger tube bundle panels arranged in the gas path width direction of a conventional exhaust heat recovery boiler.

If the gaps are left as they are, gas passes through the gaps, and as a result, the gas to pass through the heat exchanger tube bundle panels 23 is reduced and the recovery heat amount is reduced. Therefore, conventionally, for the gaps of the heat exchanger tube bundle panels 23, after installing the heat exchanger tube bundle panels 23, as shown in the sectional view in the plane direction of FIG. 31, gas short pass preventive plates 30 are set at the gas inlet and the gas outlet between the baffle plates 28 of adjacent panels 23. However, to set the gas short pass preventive plates 30 after setting scaffolding in the height direction including a high place, the installing period becomes long since safety measures such as prevention of workers falling during working at a height are taken.

Therefore, in this embodiment, the gas short pass preventive plates 29 are attached in advance at the factory or the like to the baffle plates 28 of the heat exchanger tube bundle panel 23 on one side positioned corresponding to the gas inlet and gas outlet of the heat exchanger tube bundle panel 23, and then brought to the construction site, and the heat exchanger tube bundle panel 23 attached with the gas short pass preventive plates 29 is installed first. One side surface of the rectangular gas short pass preventive plate 29 is attached to the baffle plate 28, and the opposite side surface is left free.

After the heat exchanger tube bundle panel 23 attached with the gas short pass preventive plates 29 is installed at the construction site, the other side heat exchanger tube bundle panel 23 without the gas short pass preventive plates 29 to be arranged in parallel is installed, and at this point, the other side heat exchanger tube bundle panel 23 is installed so that the gas short pass preventive plates 29 come into contact with the baffle plates 28 of the other side heat exchanger tube bundle panel 23.

Thereby, when the gas flows, the free side surfaces of the gas short pass preventive plates 29 are press-contacted with the baffle plates 28 of the other side heat exchanger tube bundle panel 23 at the gas inlet side, so that the gap between the two heat exchanger tube bundle panels 23 is eliminated, whereby gas short pass does not occur.

In addition, when the free side surfaces of the gas short pass preventive plates 29 are bent, the gas flow is efficiently caught up into the bent portions, so that the gas short pass preventive plates 29 are more securely pressed against the baffle plates 28 of the other side heat exchanger tube bundle panel 23, the gap is eliminated, and gas short pass is more reliably prevented.

Thus, by attaching the gas short pass preventive plates 29 to the baffle plates 28 located on both side surfaces of each heat exchanger tube bundle panel 23 in advance at the component manufacturing factory or the like, it becomes unnecessary to set up scaffolding for attachment at the heat recovery boiler construction site, whereby the installing period of the gas short pass preventive plates 29 is shortened and the installing operations are improved in safety.

INDUSTRIAL APPLICABILITY

According to the invention, by using the construction in that the module frames 24 and 25 that become a part of the main frames as structural members such as the main columns 33 and the main beams 34 of the heat recovery boiler are used as components of the heat exchanger tube bundle panel modules 20, the transportation costs are reduced according to the omission of the main frames such as the main columns 33 and the main beams 34 of the heat recovery boiler, and there is almost no member wasted after construction.

Furthermore, when the heat exchanger tube bundle panel modules 20 of the exhaust heat recovery boiler are installed at the construction site, a structure with high installation performance at the heat recovery boiler construction site can be applied to the joint portions between the modules 20 and between the modules 20 and the main frames of the heat recovery boiler.

In addition, by making the bottom wall columns 36 of the structural members located in advance at the heat recovery boiler construction site wider than the main columns 33, the operations for installing the heat exchanger tube bundle panel modules 20 can be reduced, the combined cycle power generation plant construction process can be rationalized, and the local installation costs can be reduced.

Furthermore, after constructing the heat recovery boiler, the module frames 24 and 25 become a part of the main frames such as the main columns 33 and the main beams 34 of the heat recovery boiler, so that almost no member is wasted after construction.

In addition, when transporting the heat exchanger tube bundle panel modules 20, vibration restraining fixing members 26 and 61 are located between the vibration restraining supports 18 located at predetermined intervals to prevent contact between adjacent heat exchanger tubes 6 and the casing 1, so that the heat exchanger tube bundle panel modules 20 can be prevented from being damaged, and transportation of the heat exchanger tube bundle panel modules 20 to a distant site becomes easy.

Furthermore, between two heat exchanger tube bundle panels 23 to be disposed adjacent to each other in the gas path width direction (direction orthogonal to the gas flow), gas short pass preventive plates 29 that are connected at one-side surfaces to the baffle plates 28 of one side heat exchanger tube bundle panel 23 and come into contact at the other side surfaces with the baffle plates 28 of the other heat exchanger tube bundle panel 23 are attached, and in particular, the side surfaces of the gas short pass preventive plates which come into contact with the baffle plates 28 of the heat exchanger tube bundle panel 23 are bent toward the gas flow upstream side inside the gas duct, whereby gas short pass between the two heat exchanger tube bundle panels 23 does not occur, so that gas reserving heat can be effectively recovered.

In addition, by connecting one-side surfaces of the gas short pass preventive plates 29 to the baffle plates 28 of one heat exchanger tube bundle panel 23 in advance, the heat exchanger tube bundle panel 23 with the gas short pass preventive plates 29 can be installed without scaffolding inside the furnace at the heat recovery boiler construction site, and this is preferable in view of safety in installing operations since it shortens the installing construction period and omits the work at a height.

What is claimed is:

1. A construction method for an exhaust heat recovery boiler which generates steam by providing a plurality of heat exchanger tubes in a gas duct in which an exhaust gas flows generally horizontally, the construction method comprising:

providing a heat exchanger tube bundle panel module, the heat exchanger tube bundle panel module comprising:

a plurality of heat exchanger tube bundle panels positioned in a gas flow direction, the plurality of heat exchanger tube bundle panels including a plurality of heat exchanger tubes, upper and lower headers provided at opposing ends of the heat exchanger tubes, and vibration restraining supports provided at predetermined intervals to prevent contact between adjacent heat exchanger tubes in a direction transverse to the lengthwise direction of the heat exchanger tubes, a casing defining the gas duct, the casing having a thermal insulating material provided inside of the casing so as to cover an outer periphery of the gas duct, the outer casing comprising a ceiling wall, a bottom wall, and side-walls, heat exchanger tube bundle panel support beams located outside the ceiling wall of the casing, the heat exchanger tube bundle panel support beams comprising ceiling walls of the casing when installed in the exhaust heat recovery boiler, header supports which penetrate the ceiling wall of the casing and connect the upper headers to the heat exchanger tube bundle panel support beams, the header supports being configured to support a plurality of heat exchanger tube bundle panels, vertical module frames comprising vertical support members of the heat exchanger tube bundle panels located outside the side-walls of the casing, the vertical support members comprising side walls of the casing when installed in the boiler, and horizontal module frames comprising horizontal support members of the heat exchanger tube bundle panel located outside the ceiling wall and bottom wall of the casing, the horizontal support members comprising ceiling walls and bottom walls of the casing when installed in the exhaust heat recovery boiler, the heat exchanger tube bundle panel module comprising at least one of a plurality of modules, the at least one of a plurality of modules having a size corresponding to parameters of the exhaust heat recovery boiler, wherein when transporting the heat exchanger tube bundle panel module, vibration restraining fixing members configured to prevent vibration of the heat exchange tubes are positioned between the vibration restraining supports and the casing, the heat exchanger tube bundle panel module having the vibration restraining fixing members positioned between the lower headers and the casing;

providing main frames configured to support the heat exchanger tube bundle panel module, the main frames including main columns, main beams and bottom wall columns which are constructed at a construction site of the exhaust heat recovery boiler prior to installing the heat exchanger tube bundle panel module, inserting the at least one of a plurality of modules between an adjacent two main columns and setting a height of the heat exchanger tube panel support beams of the heat exchanger tube bundle panel modules to a setting, height of the main beams prior to installing the heat exchanger tube bundle panel module at the exhaust heat recovery boiler construction site, connecting and fixing the vertical module frames and the main columns to each other, connecting and fixing the horizontal module frame on the ceiling wall side and the main beam to each other, and connecting and fixing the horizontal module frame on the bottom wall side and the bottom wall columns to each other.

2. The exhaust heat recovery boiler construction method according to claim 1, further comprising:

sizing each heat exchanger tube bundle panel module so as to allow at least two of the at least a plurality of modules to be positioned in a horizontal direction of a plane which is orthogonal to the gas flow of the exhaust heat recovery boiler; and providing first aseismic braces that connect the end portion inner side of the casing which comprises the ceiling wall of the heat exchanger tube bundle panel module and the central portion inner side of the casing which comprises the side wall of the heat exchanger tube bundle panel module, the first aseismic braces being located at positions facing the heat exchanger tube bundle panels on at least one of a surface side and a back surface side in the gas flow direction, and providing second aseismic braces that connect the end of the casing which comprises the bottom wall side of the heat exchanger tube bundle panel module and the central portion inner side of the casing which comprises the side wall of the heat exchanger tube bundle panel module, the second aseismic braces being located at positions facing the heat exchanger tube bundle panels on at least one of the surface side and the back surface side in the gas flow direction, wherein the first and second aseismic braces are not removed during transportation and installation of the heat exchanger tube bundle panel modules, the first and second aseismic braces being not removed after completion of the boiler construction.

3. The exhaust heat recovery boiler construction method according to claim 2, further comprising:

providing, during transportation of heat exchanger tube bundle panel modules, transporting spacers that maintain distances between the first and second aseismic braces and the surfaces and the back surfaces in the gas flow direction of heat exchanger tube bundle panels.

4. A heat exchanger tube bundle panel module for construction of an exhaust heat recovery boiler which generates steam by providing a plurality of heat exchanger tubes inside a gas duct in which gas flows horizontally, the heat exchanger tube bundle panel module for construction of an exhaust heat recovery boiler comprising:

a plurality of heat exchanger tube bundle panels positioned in a gas flow direction, each including a plurality of heat exchanger tubes, upper and lower headers provided at opposing ends of the heat exchanger tubes, and vibration restraining supports provided at predetermined intervals in a direction transverse to a lengthwise direction of the heat exchanger tubes and configured to prevent contact between adjacent heat exchanger tubes;

a casing defining the gas duct, the casing having a thermal insulating material provided inside of the casing and covering the outer peripheral portion of the gas duct, the casing comprising a ceiling wall, a bottom wall, and side walls each extending along the gas flow direction of the plurality of heat exchanger tube bundle panels;

heat exchanger tube bundle panel support beams located outside the ceiling wall of the casing, the heat exchanger tube bundle panel support beams comprising the ceiling wall when the heat exchanger tube bundle panel module is installed in the exhaust heat recovery boiler;

header supports that penetrate the ceiling wall of the casing and connect the upper headers and the heat exchanger tube bundle panel support beams, the header supports being configured to support the heat exchanger tube bundle panel module;

vertical module frames comprising vertical support members for the heat exchanger tube bundle panels located outside the casing, the vertical support frames comprising side-walls when the heat exchanger tube bundle panel module is installed in the exhaust heat recovery boiler, the vertical support frame member being provided on a casing side, the vertical support frame further comprising first aseismic braces that connect the end portion inner side of the casing which comprises the ceiling wall and the central portion inner side of the casing which comprises the side wall casing, the first aseismic braces facing the heat exchanger tube bundle panels on at least one of the surface side and the back surface side in the gas flow direction of each heat exchanger tube bundle panel module, and second aseismic braces which connect the end of the casing comprising the bottom wall side and the central portion inner side of the casing comprising the side wall side, the second aseismic braces being positioned to face the heat exchanger tube bundle panels on at least one of the surface side and the back surface side in the gas flow direction; and horizontal module frames comprising horizontal support members for the heat exchanger tube bundle panels located outside the ceiling wall and outside the bottom wall of the casing, the horizontal module frame comprising the ceiling wall and bottom wall when the heat exchanger tube bundle panel module is installed in the exhaust heat recovery boiler, wherein the heat exchanger tube bundle panel module is sized to allow at least two heat exchanger tube bundle panel modules to be positioned adjacent to each other in the horizontal direction of a plane orthogonal to the gas flow of the exhaust heat recovery boiler, the heat exchanger tube bundle panel module being configured to be positioned among main frames of the exhaust heat recovery boiler which are configured to support modules, the main framed comprising main columns, main beams, and bottom wall columns, the main columns and the vertical module frames, the main beams and the horizontal module frame on the ceiling wall side, and the bottom wall columns and the horizontal module frame on the bottom wall, respectively, being configured to be connected and fixed to each other.

5. The heat exchanger tube bundle panel module for construction of an exhaust heat recovery boiler according to claim 4, wherein the vertical module frames are provided with a first transporting reinforcing member that couples the end of the casing comprising the ceiling wall side and the end of the casing comprising the bottom wall side to each other, and the first transporting reinforcing member being configured to be removed after installation of the heat exchanger tube bundle panel module in the exhaust heat recovery boiler is completed, and a plurality of second transporting reinforcing members that couple the first transporting reinforcing member and the casing side-wall side to each other and are removed after installation of the heat exchanger tube bundle panel module in the exhaust heat recovery boiler is completed, the second transporting reinforcing members being positioned to face the heat exchanger tube bundle panel modules on at least one of the surface side and the back surface side in the gas flow direction of the respective heat exchanger tube bundle panels.

6. The heat exchanger tube bundle panel module for construction of an exhaust heat recovery boiler according to claim 4, wherein vibration restraining fixing members are positioned between the vibration restraining supports and the casing, and the vibration restraining fixing members are positioned between the lower headers and the casing.

7. The heat exchanger tube bundle panel module for construction of an exhaust heat recovery boiler according to claim 4, wherein baffle plates are attached to side surfaces of a plane orthogonal to the gas flow direction of the heat exchanger tube bundle panels of each heat exchanger tube bundle panel module the baffle plates being positioned between the heat exchanger tube bundle panels of two modules which are positioned adjacent to each other in the horizontal direction of a plane orthogonal to the gas flow, gas short pass preventive plates which are connected at one of the side surfaces of the baffle plates, and the gas short pass preventive plates contacting the other one of the side surfaces of the baffle plates of the other heat exchanger tube bundle panel.

8. The heat exchanger tube bundle panel module for construction of an exhaust heat recovery boiler according to claim 7, wherein the side surfaces of the gas short pass preventive plates are configured to come into contact with the baffle plates of each heat exchanger tube bundle panel, the side surfaces of the gas short pass preventive plates being bent toward a upstream side of the gas flow.

* * * * *

UNITED STATES PATENT AND TRADEMARK OFFICE
CERTIFICATE OF CORRECTION

| | |
|---|---|
| PATENT NO. | : 7,275,503 B2 |
| APPLICATION NO. | : 10/565298 |
| DATED | : October 2, 2007 |
| INVENTOR(S) | : Waseda et al. |

It is certified that error appears in the above-identified patent and that said Letters Patent is hereby corrected as shown below:

On the Title page, at item (75), Inventors, line 7 of the printed patent, "Eiiji" should be --Eiji--.

On the Title page, item (57), Abstract of the printed patent, "A method of constructing an exhaust heat recovery boiler. A required number of heat transfer tube group panel modules (20) are produced in an appropriate size according to design specifications of HRSG, where the heat transfer tube group panel modules (20) each have a large number of heat transfer tubes (6), heat transfer tube group panels (23) constituted of upper and lower collection tubes (7, 8) for the heat transfer tubes (6), a casing (1) for the heat transfer tube group panels (23), heat transfer tube group panel supporting beams (22) provided outside a ceiling wall portion of the casing (1), and a vertical and horizontal module frames (24, 25) provided outside the casing (1). Main frames for supporting the modules (20), including main pillars (33), main beams (34), and bottom wall portion pillars (36), are constructed in advance in a construction site of the heat recovery boiler (HRSG). Each module (20) is transported to the construction site and lowered by a crane (42) into between adjacent main pillars (33). Supporting beams (22) of each module (20) are placed at the height of installation of the main beam (34). Then the horizontal module frames (25), the main beams (34), and the bottom wall portion pillars (36) are connected and fixed, and the vertical module frames (24) and the main pillars (33) are connected and fixed." should be --The invention provides an exhaust heat recovery boiler construction method in which a necessary number of heat exchanger tube bundle panel modules each having heat exchanger tube bundle panels including a number of heat exchanger tubes and upper and lower headers of the heat exchanger tubes, a casing of the heat exchanger tube bundle panels, heat exchanger tube bundle panel support beams located outside the ceiling wall of the casing, and vertical and horizontal module frames located outside the casing, are prepared so as to have a proper size according to the design specifications of the heat recovery boiler, main frames including main columns, main beams, and bottom wall columns for supporting the modules are constructed in advance at a construction site of the exhaust heat recovery boiler (heat recovery boiler), and the modules are transported and hung down by a crane between the main columns adjacent to each other at the construction site to set the support beams of the modules at the installation height of the main beams, and the horizontal module frames, the main beams, and the bottom wall columns are connected and fixed to each other and the vertical module frames and the main columns are connected and fixed to each other.--.

UNITED STATES PATENT AND TRADEMARK OFFICE
CERTIFICATE OF CORRECTION

PATENT NO. : 7,275,503 B2
APPLICATION NO. : 10/565298
DATED : October 2, 2007
INVENTOR(S) : Waseda et al.

It is certified that error appears in the above-identified patent and that said Letters Patent is hereby corrected as shown below:

Column 12, line 18 of the printed patent, "1300° C. class" should be --1300° C class--.

Column 16, line 8 of the printed patent, "side wall casing 17" should be --side wall casing 1--.

Column 21, line 42 (claim 1, line 63) of the printed patent, "to a setting, height of" should be --to a setting height of--.

Column 24, line 22 (claim 7, line 6) of the printed patent, "bundle panel module the baffle plates" should be --bundle panel module, the baffle plates--.

Signed and Sealed this

Twenty-ninth Day of April, 2008

JON W. DUDAS
*Director of the United States Patent and Trademark Office*